(12) United States Patent
Shin et al.

(10) Patent No.: US 10,928,124 B2
(45) Date of Patent: Feb. 23, 2021

(54) REFRIGERATOR

(71) Applicant: LG ELECTRONICS INC., Seoul (KR)

(72) Inventors: Jungil Shin, Seoul (KR); Yoomin Park, Seoul (KR); Changwoan Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/855,398

(22) Filed: Apr. 22, 2020

(65) Prior Publication Data

US 2020/0248957 A1 Aug. 6, 2020

Related U.S. Application Data

(62) Division of application No. 15/765,327, filed as application No. PCT/KR2016/011073 on Oct. 4, 2016, now Pat. No. 10,677,519.

(30) Foreign Application Priority Data

Oct. 2, 2015 (KR) .......................... 10-2015-0138977
Jun. 7, 2016 (KR) .......................... 10-2016-0070595

(51) Int. Cl.
*F25D 25/02* (2006.01)
*F16H 19/04* (2006.01)
(Continued)

(52) U.S. Cl.
CPC ........... *F25D 25/025* (2013.01); *F16H 19/04* (2013.01); *F25D 23/02* (2013.01); *F25D 23/062* (2013.01);
(Continued)

(58) Field of Classification Search
CPC ...... F25D 23/02; F25D 23/062; F25D 23/067; F25D 25/025; F16H 19/04; A47B 88/437; A47B 88/497
(Continued)

(56) References Cited

U.S. PATENT DOCUMENTS 788,856 A 5/1905 Stafford
2,235,454 A 3/1941 Koropchak
(Continued)

FOREIGN PATENT DOCUMENTS

DE 10 2012 216 907 3/2014
DE 10 2013 203 724 9/2014
(Continued)

OTHER PUBLICATIONS

International Search Report and Written Opinion dated Jan. 2, 2017 issued in Application No. PCT/KR2016/011083 (with English translation).
(Continued)

*Primary Examiner* — James O Hansen
(74) *Attorney, Agent, or Firm* — Ked & Associates, LLP

(57) ABSTRACT

The refrigerator comprises: a cabinet having a storage space; a door over the storage space; support members; a storage member pushed in or drawn out along the support member, and having an opening in the top surface so that food maybe inserted therethrough; a shielding member, provided above the storage member and a rear portion of the opening; a cover member over a front portion of the opening, and is moved, when the storage member being pushed in or drawn out, in the opposite direction to the storage member, and is moved rearward between the shielding member and the storage member when the storage member is drawn out; and a driving unit connecting the storage member and the cover member so as to move together.

20 Claims, 17 Drawing Sheets

(51) Int. Cl.
*F25D 23/06* (2006.01)
*F25D 23/02* (2006.01)

(52) U.S. Cl.
CPC ........ *F25D 23/067* (2013.01); *A47B 2210/08* (2013.01); *A47B 2210/175* (2013.01)

(58) Field of Classification Search
USPC ............. 312/273, 401, 402, 404, 330.1, 331
See application file for complete search history.

(56) References Cited

U.S. PATENT DOCUMENTS

| | | | |
|---|---|---|---|
| 2,711,944 | A | 6/1955 | Meek et al. |
| 4,732,435 | A * | 3/1988 | Bailey ................... F25D 25/025 312/311 |
| 5,199,777 | A | 4/1993 | Taima et al. |
| 5,303,995 | A | 4/1994 | Kurihara |
| 6,846,053 | B2 | 1/2005 | Salice |
| 8,152,255 | B2 | 4/2012 | Nam et al. |
| 8,226,182 | B2 | 7/2012 | Park et al. |
| 8,376,481 | B2 * | 2/2013 | Lee ....................... F25D 25/025 312/402 |
| 8,936,332 | B2 | 1/2015 | Park et al. |
| 2005/0145704 | A1 | 7/2005 | Hwang |
| 2007/0011950 | A1 | 1/2007 | Wood |
| 2007/0262686 | A1 | 11/2007 | Ji |
| 2008/0047295 | A1 | 2/2008 | Kim et al. |
| 2008/0265733 | A1 | 10/2008 | Hue et al. |
| 2011/0095670 | A1 | 4/2011 | Cho et al. |
| 2011/0219808 | A1 * | 9/2011 | Oh ........................ F25D 25/025 62/465 |
| 2015/0241117 | A1 | 8/2015 | Burke et al. |
| 2016/0282036 | A1 | 9/2016 | Lee et al. |

FOREIGN PATENT DOCUMENTS

| | | |
|---|---|---|
| EP | 2 594 877 | 5/2013 |
| JP | 02037276 | 2/1990 |
| JP | 2000-180042 | 6/2000 |
| JP | 2006-138487 | 6/2006 |
| KR | 10-1999-0053424 | 7/1999 |
| KR | 10-2005-0072298 | 7/2005 |
| KR | 10-2005-0105342 | 11/2005 |
| KR | 10-2008-0012685 | 2/2008 |
| KR | 10-2010-0028841 | 3/2010 |
| KR | 10-2011-0042362 | 4/2011 |
| KR | 10-2011-0046237 | 5/2011 |
| KR | 10-2013-0011827 | 1/2013 |
| WO | WO 2014/201615 | 12/2014 |
| WO | WO 2015/072591 | 5/2015 |

OTHER PUBLICATIONS

United States Office Action dated Feb. 20, 2019 issued in co-pending related U.S. Appl. No. 15/763,916.
European Search Report dated May 15, 2019 issued in EP Application No. 16852144.1.
European Search Report dated May 16, 2019 issued in Application No. 16852141.7.

* cited by examiner

REFRIGERATOR

CROSS-REFERENCE TO RELATED PATENT APPLICATIONS

This application is a Divisional Application of U.S. application Ser. No. 15/765,327, filed Apr. 2, 2018, which is a U.S. National Stage Application under 35 U.S.C. § 371 of PCT Application No. PCT/KR2016/011073, filed Oct. 4, 2016, which claims priority to Korean Patent Application No. 10-2015-0138977, filed Oct. 2, 2015, and Korean Patent Application No. 10-2016-0070595, filed Jun. 7, 2016, whose entire disclosures are hereby incorporated by reference.

TECHNICAL FIELD

The present disclosure relates to a refrigerator. Specifically, the present disclosure relates to a refrigerator having a storage member which can be drawn out of a space in which an object to be refrigerated or frozen is stored, and the present disclosure relates to a refrigerator in which an opening of the storage member can be easily opened or closed and an open area of the opening can be expanded.

BACKGROUND ART

In general, a refrigerator is a home appliance for storing food in a storage space therein, which is shielded by a door, and is configured to keep food in an optimal state by cooling the inside of the storage space using the cool air generated through heat exchange with a refrigerant that circulates a cooling cycle. The refrigerator tends to be enlargement and multifunction in accordance with change of food life and various tastes of users, and a refrigerator configured to have various spaces for use convenience of users and have a convenience device is launching.

For example, the refrigerator of the related art includes a rack partitioning a storage space up and down and a drawer arranged below the rack and drawn out toward a forward direction. Meanwhile, the drawer applied to the refrigerator of the related art forms a storage space opened upwardly, and is provided to insert or draw food into or out of the storage space after the storage space is exposed by the user by forward pulling the drawer to allow the drawer to be drawn out.

At this time, since the exposed area of the storage space of the drawer corresponds to the area where the drawer is drawn out, the user should draw out the drawer more and more to put storage goods having a big volume or a long length into the drawer. Therefore, inconvenience occurs in use of the drawer if the volume of the storage goods is big when the user puts the storage goods into the storage space of the drawer.

DISCLOSURE

Technical Problem

An object of the present disclosure is to basically solve the aforementioned problem. Through one embodiment of the present disclosure, another object of the present disclosure is to provide a refrigerator in which a storage member of which storage space is exposed by movement is provided, and the storage space is wider than the moving width of the storage member.

Through one embodiment of the present disclosure, still another object of the present disclosure is to provide a refrigerator in which a moving direction of a storage member is different from that of a cover member that opens or closes a storage space of the storage member. Through one embodiment of the present disclosure, further still another object of the present disclosure is to provide a refrigerator in which an insertion operation may be performed easily in a state a storage member is drawn out.

Through one embodiment of the present disclosure, further still another object of the present disclosure is to provide a refrigerator in which a cover member may close a storage space of a storage member after the cover member moves backward and then automatically moves forward. In this case, a refrigerator is provided in which a cover member may close a storage member even though a user manipulates only the storage member without manipulating the cover member.

Through one embodiment of the present disclosure, further still another object of the present disclosure is to provide a refrigerator in which a front end of a cover member ascends to enlarge an inlet area of a storage member. Particularly, a refrigerator is provided in which an inlet area of a storage member may be more enlarged because a user's eyes and hand approach to the inlet in an oblique direction.

Technical Solution

To achieve the objects, according to one embodiment of the present disclosure, a refrigerator comprises a cabinet having a storage space; a door for opening and closing the storage space; a pair of support members, each of which is provided at each of both sides of the storage space; a storage member provided between the pair of support members and inserted into and drawn out along the support members, having an inlet on an upper surface so that food is inserted therethrough; a shielding member provided above the storage member, for shieling a rear portion of the inlet of the storage member; a cover member shielding a front portion of the inlet of the storage member, moving in an opposite direction of a moving direction of the storage member by interworking with insertion and draw-out operation of the storage member and moving backward between the shielding member and the storage member when the storage member is drawn out; and a driving unit connecting the storage member and the cover member so as to interwork with each other.

The storage member may be provided to be more protruded forward than the shielding member in a state that the storage member is inserted. The cover member may be provided to shield a front portion of the inlet of the storage member more protruded forward than the shielding member. Therefore, the front portion of the inlet formed above the storage member may be shielded by the cover member, and the rear portion thereof may be shielded by the shielding member.

Preferably, an area spaced up and down is formed between the shielding member and the storage member so that the cover member may be inserted into the spaced area. That is, the cover member may slidably be inserted into the spaced area between the shielding member and the storage member.

The shielding member may be any one of a drawer assembly forming a separate storage space and a rack on which food is mounted. A lower wall of the drawer assembly or the rack may shield the inlet of the storage member at the upper portion.

The driving unit may include a second gear assembly coupled with the storage member, moving in the same direction as that of the storage member when the storage member is inserted or drawn out; a first gear member coupled with the cover member, moving in the same direction as that of the cover member; and a connection gear rotatably provided between the second gear assembly and the first gear member, connecting the second gear assembly with the first gear member.

The second gear assembly may move in a single body with the storage member, and the first gear member may move in a single body with the cover member. Preferably, the second gear assembly, the first gear member and the connection gear are provided outside the support members.

Preferably, the support members are provided with a second slot for proving a passage where the second gear assembly and the storage member are coupled with each other, and a first slot for providing a passage where the first gear member and the cover member are coupled with each other. That is, an element provided outside the support members and an element provided inside the support members may be coupled with each other through the slots. That is, a force may be delivered between both elements.

The second gear assembly may be provided to release coupling with the storage member as the storage member is drawn out, so as to release interworking between the storage member and the cover member. That is, the storage member and the second gear assembly move forward together, and if the storage member is drawn out to reach a preset distance, coupling between the storage member and the second gear assembly may be released. If coupling between the storage member and the second gear assembly is released, the storage member may be more drawn out in a state the coupling with the second gear assembly is released.

The storage member and the second gear assembly may again be coupled with each other as the storage member is inserted in a state that the coupling between the storage member and the second gear assembly is released. In a state that the storage member and the second gear assembly are coupled with each other, the storage member and the second gear assembly may move backward together.

The storage member may elastically be deformed as it is drawn out, so as to provide an elastic member for providing an elastic restoring force in an insertion direction of the storage member and a forward moving direction of the cover member. Preferably, one end of the elastic member is fixed to the support members, and the other end of the elastic member is fixed to the second gear assembly.

Therefore, the elastic member is elastically deformed if the second gear assembly moves forward. If the coupling between the second gear assembly and the storage member is released, the elastic member is maintained at the elastically deformed state. If the second gear assembly and the storage member are again coupled with each other as the storage member is manually inserted, the storage member may be more inserted by an elastic restoring force of the elastic member. At this time, the cover member moves forward by means of the elastic restoring force and then closes the inlet at the front of the storage member. That is, the cover member may automatically close the storage member even though a user manipulates only the storage member without manipulating the cover member.

The second gear assembly may include a second gear member connected with the connection gear by gear coupling; and a binding member rotatably coupled to the second gear member and selectively coupled with the storage member by rotation. Preferably, the cover member includes a cover body provided to ascend a front end when the cover member moves backward, enlarging an area of the inlet.

Ascending of the front end of the cover member more enlarges the area of the inlet. The storage member may be at a position where a user's hand and eyes may approach toward a downward oblique direction. Therefore, ascending of the front end of the cover member may more enlarge the area of the inlet in a direction vertical to the oblique direction.

Preferably, the cover body is supported in an upper surface of the support members. Therefore, the cover body slidably moves backward along the support members and at the same time the front end may ascend.

Preferably, the upper surface of the support members is formed as an upwardly convex curved surface, and the cover body is formed as an upwardly convex curved surface to be matched with the upwardly convex curved surface of the support members in shape. Through the curved surfaces, the area of the inlet may be increased and the cover member may move smoothly.

The cover member may include a cover moving unit connected with the driving unit at the rear of the cover body; and a fastening unit connecting the cover body with the cover moving unit. Preferably, the cover body is rotatably connected with the cover moving unit through the fastening unit. A rear end of the cover body performs linear movement forward and backward together with the cover moving unit. Since the front end of the cover body is rotated with respect to the rear end of the cover body, the front end of the cover body ascends up and down while moving forward and backward.

To achieve the objects, according to one embodiment of the present disclosure, a refrigerator comprises a cabinet having a storage space; a door for opening and closing the storage space; a pair of support members, each of which is provided at each of both sides of the storage space; a storage member provided between the pair of support members and inserted into and drawn out along the support members, having an inlet on an upper surface so that food is inserted therethrough; a shielding member provided above the storage member, for shielding a rear portion of the inlet of the storage member; a cover member shielding a front portion of the inlet of the storage member and moving in an opposite direction of a moving direction of the storage member by interworking with insertion and draw-out operation of the storage member, provided to ascend a front end while moving backward between the shielding member and the storage member when the storage member is drawn out; and a driving unit connecting the storage member and the cover member so as to interwork with each other.

The cover member may include a cover body having a rear end provided to move forward and backward and a front end provided to ascend while being rotated based on the rear end during forward and backward movement. The cover member may include the cover body; a cover moving unit connected with the driving unit at the rear of the cover body; and a fastening unit rotatably connecting the cover body with the cover moving unit. Preferably, the cover body is formed as an upwardly convex curved surface, and the upper surface of the support members is formed as an upwardly convex curved surface to be matched with the upwardly convex curved surface of the cover body to support the cover body.

A refrigerator according to one embodiment of the present disclosure comprises a cabinet having a storage space; a door for opening and closing the storage space; a pantry assembly provided in the storage space, forming a separate food storage space; a shielding member provided above the pantry assembly, partially shielding an upper surface of the pantry assembly; a pair of support members arranged at both sides of the storage space; a storage member provided between the pair of support members and inserted into and drawn out along the support members; a cover member partially shielding an opened upper surface of the storage member, moving in an opposite direction of a moving direction of the storage member by interworking with insertion and draw-out operation of the storage member; and a driving unit provided in the support members, connecting the storage member and the cover member so as to interwork with each other, wherein some of the opened upper surface of the storage member is shielded by the shielding member and the other opened upper surface is shielded by the cover member in a state that the storage member is insertee, and the cover member slidably moves to an area between the shielding member and the storage member when the storage member is drawn out.

Preferably, the storage member is provided to be more protruded forward than the shielding member in a state that the storage member is inserted, and the cover member is provided to shield the opened surface of the storage member more protruded forward than the shielding member. An area spaced up and down may be formed between the shielding member and the storage member so that the cover member may be inserted into the spaced area. Therefore, the cover member may smoothly move backward without any disturbing element.

The shielding member is a drawer assembly forming a separate storage space. To identify the drawer assembly from the storage member, an element including the storage member may be the pantry assembly. The shielding member may be a plate shaped rack on which food may be arranged.

The driving unit may include a second gear assembly coupled with the storage member, moving in the same direction as that of the storage member when the storage member is inserted or drawn out; a first gear member coupled with the cover member, moving in the same direction as that of the cover member; and a connection gear rotatably provided between the second gear assembly and the first gear member, connecting the second gear assembly with the first gear member.

Preferably, the second gear assembly, the first gear member and the connection gear are provided outside the support members, and the support members are provided with a second slot for proving a passage where the second gear assembly and the storage member are coupled with each other, and a first slot for providing a passage where the first gear member and the cover member are coupled with each other.

The first gear member is provided with a cover coupling unit protruded toward an inner side of the support members by passing through the first slot, and a first gear mounting unit into which the cover coupling unit is inserted may be formed to be recessed at a side of the cover member. The first gear mounting unit is formed to be opened backward. One of the first gear mounting unit and the cover coupling unit is provided with a hook protrusion which is protruded, and the other one is provided with a hook groove coupled with the hook protrusion.

The second gear assembly is provided to release coupling with the storage member when the cover member moves backward at a maximum range, moves to a draw-out direction of the storage member after coupling with the storage member is released, and again coupled with the storage member and then moves together with the storage member when the storage member is inserted.

The driving unit further includes an elastic member that forces insertion of the storage member in a state that the storage member and the second gear assembly are coupled with each other. One end of the elastic member is fixed to one side of the support members, and the other end of the elastic member is fixed to one side of the second gear assembly.

The second gear assembly and the first gear member are formed to be extended longitudinally in a moving direction of the storage member, a rack gear coupled with the connection gear by gear coupling is formed along the extended direction in the second gear assembly and the first gear member, and the connection gear is a pinion gear. The second gear assembly includes a second gear member coupled with the connection gear by gear coupling and a binding member rotatably coupled to one side of the second gear member and selectively coupled to the storage member by rotation.

The binding member is provided rotatably up and down, is coupled with the storage member during upward rotation, and is provided to release coupling with the storage member during downward rotation. A binding member protrusion which is protruded is formed on a surface of the binding member toward the support members, and is inserted into the support members, whereby a binding member guide is formed to guide movement and rotation of the binding member. The binding member protrusion is formed at a position spaced apart from a rotational axis of the binding member.

The binding member guide includes a moving guide formed to be extended forward and backward, supporting the binding member protrusion in a state that the binding member is rotated upwardly and guiding forward and backward movement of the binding member protrusion, and a rotation guide extended downwardly at the front end of the moving guide, downwardly rotating the binding member by downwardly guiding the binding member protrusion. The rotation guide is extended from the front end of the moving guide to a downward direction and is formed to be inclined backward.

A hook portion in which the binding member protrusion is bound and moves to the front of the second gear assembly is formed in a portion where the rotation guide and the rotation guide are in contact with each other. The binding member protrusion is detached from the hook portion by rotation of the binding member, which is caused by contact between one side of the storage member and the binding member, when the storage member is inserted.

A gear operation unit which is protruded is formed at a side of the storage member, and a binding portion into which the gear operation unit is inserted and bound is formed to be recessed in the binding member. The binding portion is opened in a draw-out direction of the storage member during downward rotation of the binding member, whereby the gear operation unit is detached from the binding member.

To achieve the objects, according to one embodiment of the present disclosure, a refrigerator comprises a storage compartment including an opened surface communicated with the outside and providing a space where refrigerating goods or freezing goods are stored; a drawer provided to be drawn out of the storage compartment toward the front, including a storage unit providing the space where the refrigerating goods or the freezing goods are stored and having an inlet on an upper surface; the storage unit provided in the drawer, providing the space where the refrigerating goods or the freezing goods are stored and having the inlet on the upper surface; first and second support members provided at both facing ends of the drawer, providing a moving path of the drawer; a cover member supported in the first and second support members and located above the storage unit, preventing a front area of the inlet from being externally exposed; and a driving unit moving the cover member to expose the inlet if the drawer moves to a direction of the opened surface and moving the cover member so as not to expose the inlet if the drawer moves to be far away from the opened surface.

The driving unit may move the cover member in an opposite direction of the moving direction of the drawer. That is, the driving unit moves the cover member to enlarge the inlet if the drawer moves in a draw-out direction, and moves the cover member to close the inlet if the drawer moves in an insertion direction.

The driving unit may include a first gear moving along a direction parallel with a moving direction of the cover member, fixed to the cover member; a second gear moving along a direction parallel with a moving direction of the drawer, fixed to the drawer; and a connection gear rotatably provided between the first gear and the second gear, connecting the first gear with the second gear. The first support member may include a first body to which the connection gear is rotatably fixed; a first gear guider provided in the first body, guiding movement of the first gear; and a second gear guider provided in the first body, guiding movement of the second gear. One embodiment of the present disclosure may further include a first connector for coupling the first gear with the cover member, and a second connector for coupling the second gear with the drawer.

The first support member may include a first body provided along a direction parallel with the moving direction of the drawer; a first gear guider provided in an opposite side of a side where the drawer is located in an area of the first body, providing a moving path of the first gear; a first slot provided in the first gear guider to pass through the first body, providing a moving path of the first connector; a second gear guider provided in an opposite side of a side where the drawer is located in the area of the first body; and a second slot provided in the second gear guider to pass through the first body, providing a moving path of the second connector. The second connector may further include a detachable body coupled to the second gear by a hinge, moving along the second slot, to which the drawer body is detachably coupled; and a connector guider provided in the second gear guider, detaching the detachable body from the drawer when the drawer body is drawn out of the storage space.

One embodiment of the present disclosure may further include a gear operation unit protruded from the drawer to the first body; first and second stoppers provided in the detachable body, providing a space in which the gear operation unit is received; and a coupling axis coupling the detachable body to the connector guider. The connector guider may move the coupling axis to allow the stopper provided to be close to the inlet from the first and second stoppers to be far away from the drawer if the drawer is drawn out of the storage compartment at a preset reference distance or more. The connector guider may further include a first axis guider provided in the second gear guider to be parallel with the moving direction of the drawer, providing a moving path of the coupling axis; and a second axis guider extended from the first axis guider to a direction far away from the drawer, providing the moving path of the coupling axis.

One embodiment of the present disclosure may further include a protrusion provided in any one of the drawer and the first body; and a drawer guider provided in the other one of the drawer and the first body to be parallel with a moving direction of the drawer, providing a moving path of the protrusion. The first support member may include a first body provided along a direction parallel with the moving direction of the drawer; and a first front curved portion provided to be protruded from an upper surface of the first body. The second support member may include a second body provided along a direction parallel with the moving direction of the drawer; and a second front curved portion provided to be protruded from an upper surface of the second body.

The cover member may include a cover body supported in the first front curved portion and the second front curved portion, preventing the front of the inlet from being externally exposed; and a moving unit connected with the first gear and rotatably coupled with the cover body. The first curved portion, the second curved portion and the cover body may be provided to have the same curvature.

One embodiment of the present disclosure may further include a first cover guider provided in the first front curved portion, supporting one end of an edge of the cover body and guiding movement of the cover member; and a second cover guider provided in the second front curved portion, supporting the other end of the edge of the cover body and guiding movement of the cover member.

One embodiment of the present disclosure may further include a protrusion provided in any one of the cover body and the moving unit; and a slot provided in the other one of the cover body and the moving unit to receive the protrusion, providing a space where the protrusion may move along a height direction of the drawer. The cover member may be provided to cover only a partial area of the inlet. The drawer may further include a drawer communication unit for communicating the storage unit with the storage space.

The features in the aforementioned embodiments may complexly be applied to the other embodiments unless contradicted or exclusive.

Advantageous Effects

First of all, the cover member for partially shielding the opened surface of the storage member in a state that the storage member is inserted moves in an opposite direction of the moving direction of the storage member by interworking with insertion and draw-out operation of the storage member. Therefore, since the storage space wider than the draw-out width of the storage member is exposed, the user may easily insert or draw foods of a relatively great volume into or out of the storage space even though the user draws the storage member out of the storage space at a relatively small width. Therefore, use convenience of the storage member may be improved remarkably.

Secondly, in a state that the storage member is inserted, the opened surface of the storage member is partially shielded by the shielding member provided above the storage member and the other opened surface is shielded by the cover member. In this case, the cover member slidably moves to the area between the shielding member and the storage member when the storage member is drawn out. Therefore, the cover member may move without interfering with the other elements in the refrigerator including the shielding member when the cover member moves by interworking with the insertion and draw-out operation of the storage member.

Thirdly, the driving unit connecting the storage member with the cover member includes the second gear assembly coupled with the storage member, the first gear member coupled with the cover member, and the connection gear connecting the second gear assembly with the first gear member. At this time, since the connection gear is rotatably provided between the first gear member and the second gear assembly, the first gear member and the second gear assembly may move in an opposite direction.

Fourthly, since the driving unit further includes the elastic member for forcing insertion of the storage member, the storage member may easily be inserted by the elastic force of the elastic member in a state that the storage member is drawn out. Therefore, even though heavy food is received in the storage member, the user may insert the storage member at a less force, whereby use convenience is improved.

Fifthly, the second gear assembly is released from coupling with the storage member when the cover member moves backward at a maximum range, and is again coupled with the storage member when the storage member is inserted, whereby the second gear assembly moves together with the storage member. Therefore, the storage member is released from connection with the driving unit in a state that the cover member moves backward at a maximum range, whereby a draw-out operation may be performed continuously.

Sixthly, the second gear assembly includes the second gear member coupled with the connection gear and the binding member rotatably coupled to the second gear member and selectively coupled with the storage member by rotation. The binding member is provided rotatably up and down, and is provided to be coupled with the storage member during upward rotation and to be released from coupling with the storage member during downward rotation. At this time, since the binding member is released from coupling with the storage member by downward rotation corresponding to a gravity direction, coupling release from the storage member may be performed more stably.

Seventhly, in the coupling structure between the first gear member and the cover member, the first gear member is provided with the cover coupling unit protruded inwardly, and the first gear mounting unit into which the cover coupling unit is inserted and coupled is formed to be recessed at the side of the cover member. At this time, the first gear mounting unit is formed to be opened toward the rear of the cover member. Therefore, during coupling between the cover member and the first gear mounting unit, since the cover member moves backward and thus the first gear mounting unit is slidably inserted into the cover coupling unit, the first gear mounting unit may easily be coupled with the cover member, whereby assembly work may be performed easily.

Eighthly, the refrigerator may be provided in which the cover member moves backward and then moves automatically forward to close the storage space of the storage member. Therefore, the cover member may close the storage member even though the user manipulates the storage member only without manipulating the cover member.

Ninthly, the refrigerator may be provided, which enlarge the area of the inlet of the storage member by ascending the front end of the cover member. Particularly, since the user's eyes and the user's hand approach to the inlet in an oblique direction, the refrigerator may be provided in which the area of the inlet of the storage member may be more enlarged.

BEST MODE FOR CARRYING OUT THE DISCLOSURE

Reference will now be made in detail to the preferred embodiments of the present disclosure, examples of which are illustrated in the accompanying drawings. However, spirits of the present disclosure is not limited to the embodiments, and other regressive disclosure or other embodiments included in a range of spirits of the present disclosure may be suggested easily by addition, modification, deletion, etc. of anther elements.

Figure 1:
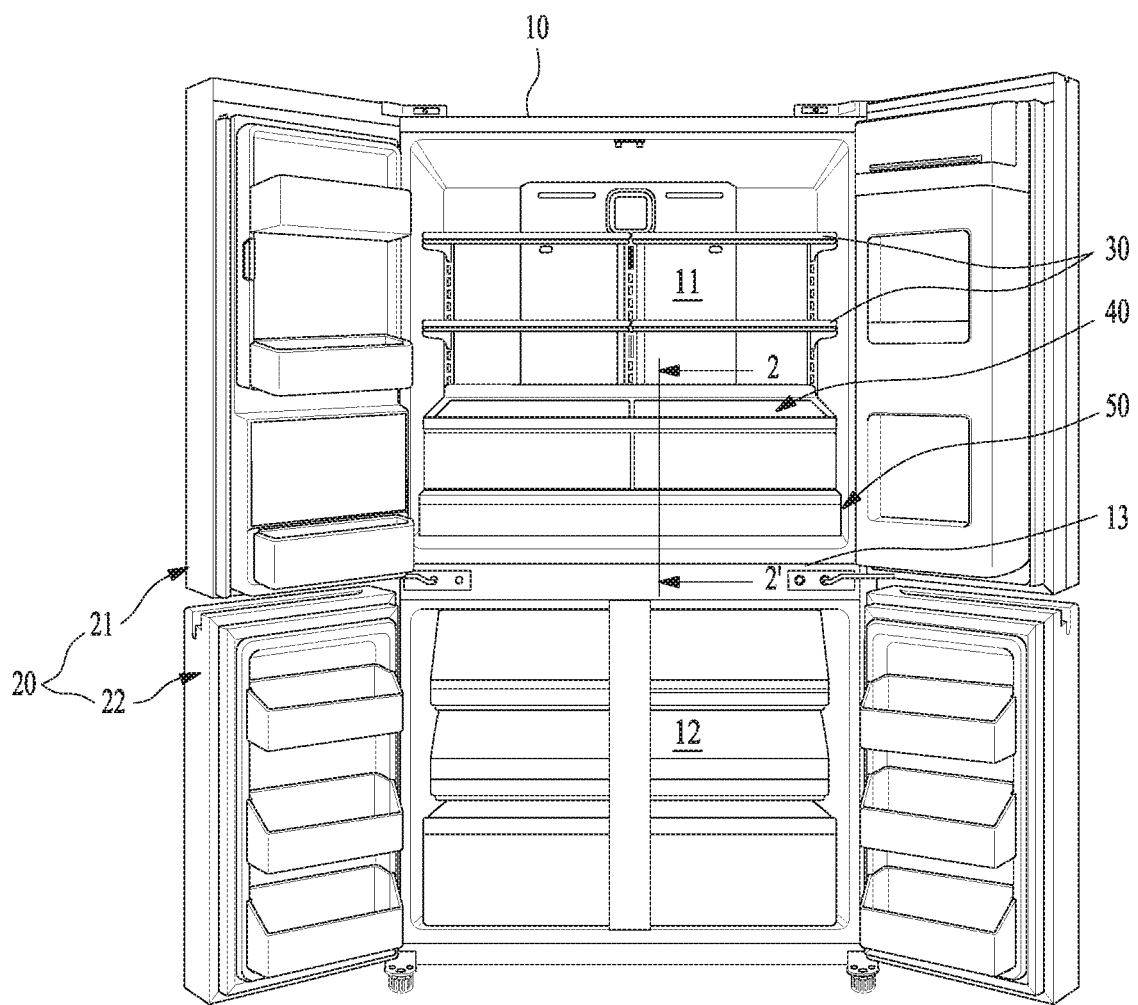
FIG. 1 is a perspective view illustrating that a door of a refrigerator according to the embodiment of the present disclosure is opened.

FIG. 1 is a perspective view illustrating that a door of a refrigerator according to the embodiment of the present disclosure is opened. As shown, an external the refrigerator according to the embodiment of the present disclosure may be formed by a cabinet 10 forming a storage space and a door 20 for opening or closing the storage space.

The storage space may be partitioned up and down by a barrier 13, wherein a refrigerating compartment 11 may be formed at an upper side based on the barrier 13, and a freezing compartment 12 may be formed at a lower side based on the barrier 12. The barrier 13 may be provided to partition the storage space from side to side, and the freezing compartment and the refrigerating compartment may be formed by being partitioned from side to side. Also, the storage space may not be partitioned, and this storage space structure of the refrigerator is not limited to this embodiment.

Meanwhile, the door 20 may include a refrigerating compartment door 21 and a freezing compartment door 22. The refrigerating compartment door 21 may be provided to open or close an opened front surface of the refrigerating compartment 11 by means of rotation. The freezing compartment door 22 may be provided to open or close an opened front surface of the freezing compartment 12 by means of rotation.

The refrigerating compartment 21 and the freezing compartment door 22 may be provided in pairs from side to side. In detail, the refrigerating compartment door 21 may be provided in pairs from side to side, wherein one of the doors may be opened or closed by rotation of a left area of the refrigerating compartment 11, and the other one door may be opened or closed by rotation of a right area of the refrigerating compartment 11. The freezing compartment door 22 may be provided in pairs from side to side, wherein one of the doors may be opened or closed by rotation of a left area of the freezing compartment 12, and the other one door may be opened or closed by rotation of a right area of the freezing compartment 12. A plurality of members for receiving food, such as baskets and daily corner, may be provided on a rear surface of the door 20.

Meanwhile, a pantry assembly 50 of which storage space of food is exposed by forward insertion and draw-out may be provided in the storage space. The pantry assembly 50 is characterized in that a food storage space having an area greater than a draw-out area is externally exposed when the food storage space is drawn out forward.

The pantry assembly 50 may be provided anywhere in the refrigerating compartment 11 and the freezing compartment 12. Hereinafter, a structure that the pantry assembly 50 is provided in the refrigerator 11 will be described in detail.

A rack 30 may be provided in the refrigerating compartment 11. The rack 30 may be provided in a plate shape for partitioning the refrigerating compartment 11 up and down, and a plurality of racks 30 may be provided from side to side and up and down.

The pantry assembly 50, which may store food separately, may be provided at a lower portion of the refrigerating compartment 11. The pantry assembly 50 may be arranged at the lowest area of the refrigerating compartment 11, and may be provided by being mounted and supported in the barrier 13.

The pantry assembly 50 may be formed to have a left and right width corresponding to a left and right width of the refrigerating compartment 11 and then adjoin left and right sidewalls of the refrigerating compartment 11. The pantry assembly 50 may include a storage member 200 (or drawer) (FIG. 2) inserted or drawn out forward or backward. At this time, the storage member 200 may be provided in a shape such as a drawer having a left and right width corresponding to the left and right width of the refrigerating compartment 11.

A shielding member for partially shielding an opened upper surface of the storage member 200 in a state that the storage member 200 is inserted, may be provided above the pantry assembly 50. The shielding member may be a drawer assembly 40 that may store food separately, or may be a plate shaped member such as a rack where food may be mounted.

Hereinafter, the embodiment in which the shielding member is a drawer assembly 40 will be described. The drawer assembly, which may store food separately, may be provided above the pantry assembly 50. The drawer assembly 40 may be provided in a shape on which food may be mounted, or may be provided to be mounted on the pantry assembly 50.

Figure 2:
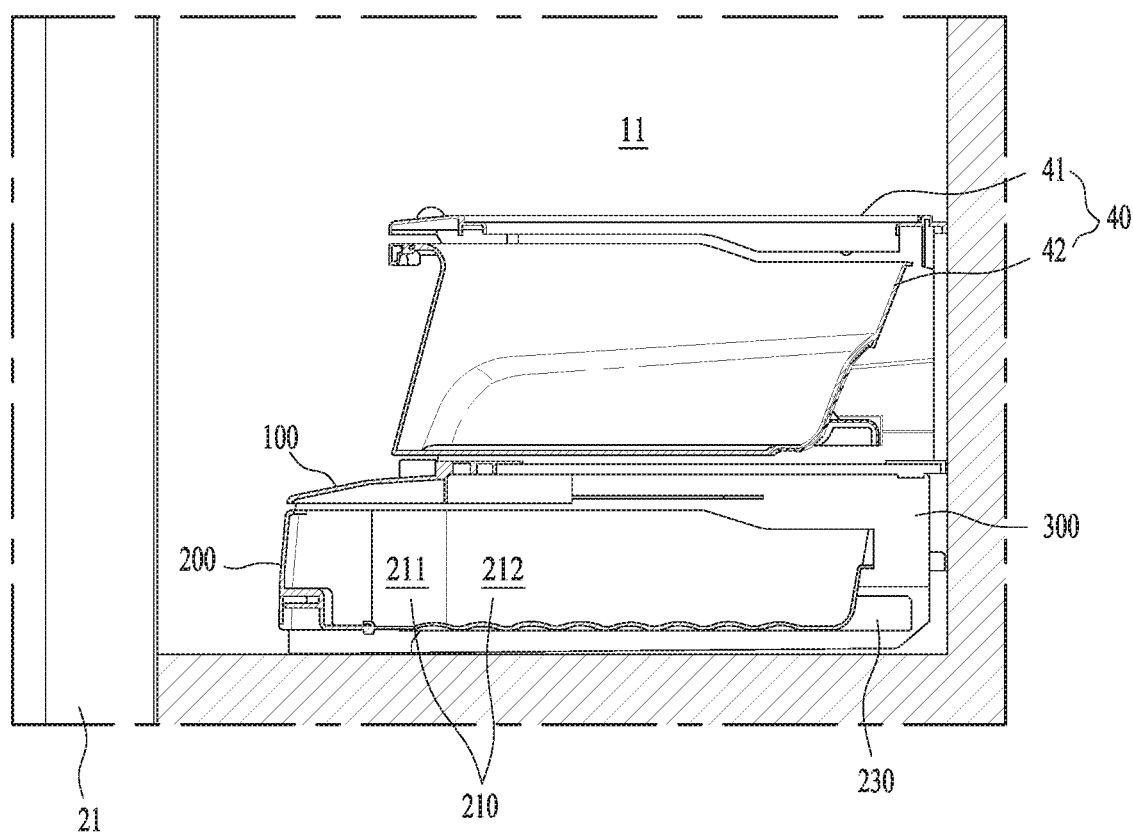
FIG. 2 is a cut view illustrating that a side storage member and a pantry assembly in FIG. 1 are cut based on 2'-2".
Figure 3:
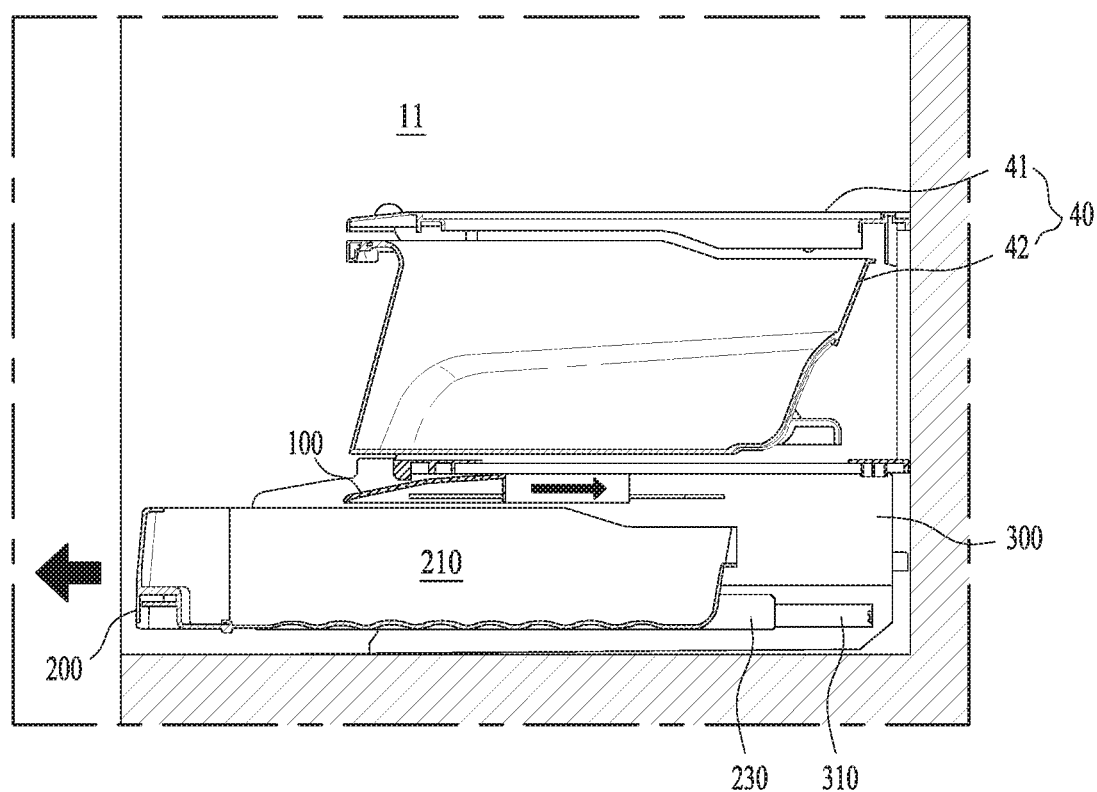
FIG. 3 is a view illustrating that a pantry assembly in FIG. 2 is drawn out.

FIG. 2 is a cut view illustrating that a side storage member and a pantry assembly in FIG. 1 are cut based on 2'-2", and FIG. 3 is a view illustrating that a pantry assembly in FIG. 2 is drawn out. The pantry assembly 50 may include the storage member 200 that may be inserted or drawn out forward or backward, and support members (or support) 300 and 400 to or from which the storage member 200 is inserted or drawn out.

The storage member 200 may be provided with a storage space 210 opened upwardly. That is, the storage member 200 may be formed to have a lower surface for forming the storage space 210 and a surrounding surface protruded upwardly along a lower edge.

The support members 300 and 400 may be arranged at both sides of the storage member 200, and may be provided to be fixed to an inner wall of the refrigerating compartment 11. The support members 300 and 400 may include a first support member 300 arranged at the left side of the storage member 200 and a second support member 400 (FIG. 4) arranged at the right side of the storage member 200.

Meanwhile, in this embodiment, the first support member and the second support member are provided in the same structure for stable insertion and draw-out operation of the storage member 200. In this embodiment, the storage member 200 has a symmetrical structure from side to side. Therefore, a detailed structure of the first support member 300 and a left structure of the storage member 200 will be described in detail for convenience of description.

A rail coupling unit 230 protruded outwardly may be formed at the left side of the storage member 200. The rail coupling unit 230 may be inserted into the first support member 300, whereby a rail unit 310 to which sliding movement is guided may be formed.

Meanwhile, the pantry assembly 50 may include a cover member (or cover) 100 for partially covering the storage space 210 of the storage member 200. The cover member 100 may be provided to move in an opposite direction of a draw-out direction of the storage member 200 when the storage member 200 is drawn out.

Meanwhile, a shielding member for covering the other area of the storage space 210 except an area covered by the cover member 100 in a state that storage member 200 is inserted in a maximum range may be provided at an upper side of the storage member 200. The shielding member may be the drawer assembly 40, or may be a plate shaped member such as a rack on which food may be mounted. The storage space 210 may be categorized into a front storage space 211 covered by the cover member 100 and a rear storage space 212 covered by the shielding member in a state that the storage member 200 is inserted in a maximum range.

The cover member 100 is arranged at the upper side of the storage member 200 to correspond to the front storage space 211, and may move backward when the storage member 200 is drawn out forward, whereby the storage space 210 of a front and rear length longer than the draw-out distance of the storage member 200 may be exposed. At this time, the cover member 100 may be inserted into an area between the storage member 200 and the shielding member. To this end, an area spaced up and down may be formed between the storage member 200 and the shielding member. The cover member 100 may be arranged at a height corresponding to the spaced area.

If the shielding member is the drawer assembly 40, the drawer assembly 40 may include a side drawer 42 inserted or drawn out forward or backward, in which food is stored, and a side drawer case 41 in which the side drawer 42 is mounted to be inserted or drawn out. The side drawer case 41 may be provided to cover upper and lower sides of the side drawer 42, and may be formed to form a space opened forward to receive the side drawer 42 and to be inserted or drawn out forward or backward. An upper surface of the side drawer case 41 may be formed in a plate shape such as the rack 30, to allow food to be mounted thereon.

Meanwhile, the pantry assembly 50 may have a structure protruded more forward than the drawer assembly 40. In detail, in a state that the storage member 200 and the side drawer 40 are initially inserted at a maximum range, a front surface of the storage member 200 may be protruded more forward than a front surface of the side drawer 40. That is, the front surface of the storage member 200 may be more protruded than the front surface of the side drawer 40, thereby providing a step difference from the front surface of the side drawer 40.

At this time, the area of the storage member 200 more forward protruded than the side drawer 40 may be the are covered by the cover member 100. That is, the cover member 100 covers the area more forward protruded than the side drawer 40 in a state that the storage member 200 is inserted at a maximum range. When the storage member 200 moves forward, the storage member 200 moves backward, whereby the storage space 210 of the storage member 200 may be exposed more widely.

Meanwhile, as shown in FIG. 2, the spaced area may be formed between the front surface of the storage member 200 and the rear surface of the refrigerating compartment door 21. Therefore, in the structure that the refrigerating compartment 11 is opened or closed by a pair of refrigerating compartment doors 21 and the storage member 200 is formed at a size corresponding to the left and right width of the refrigerating compartment 11, the storage member 200 may be drawn out even though only one of the pair of refrigerating compartment doors 21 is opened.

That is, after the user opens one refrigerating compartment door 21, the storage member 200 may be drawn out as much as the space where the rear surface of the refrigerating compartment door 21 and the front surface of the storage member 200 are spaced from each other. At this time, the if the storage member 200 is drawn out forward, the cover member 100 moves backward, whereby the storage space 210 of the storage member 200 is more exposed than the draw-out distance. Therefore, the user may more easily use the storage space 210 by opening only one of the refrigerating compartment door 21 even in case that the draw-out distance of the storage member 200 is restrictive.

Figure 4:
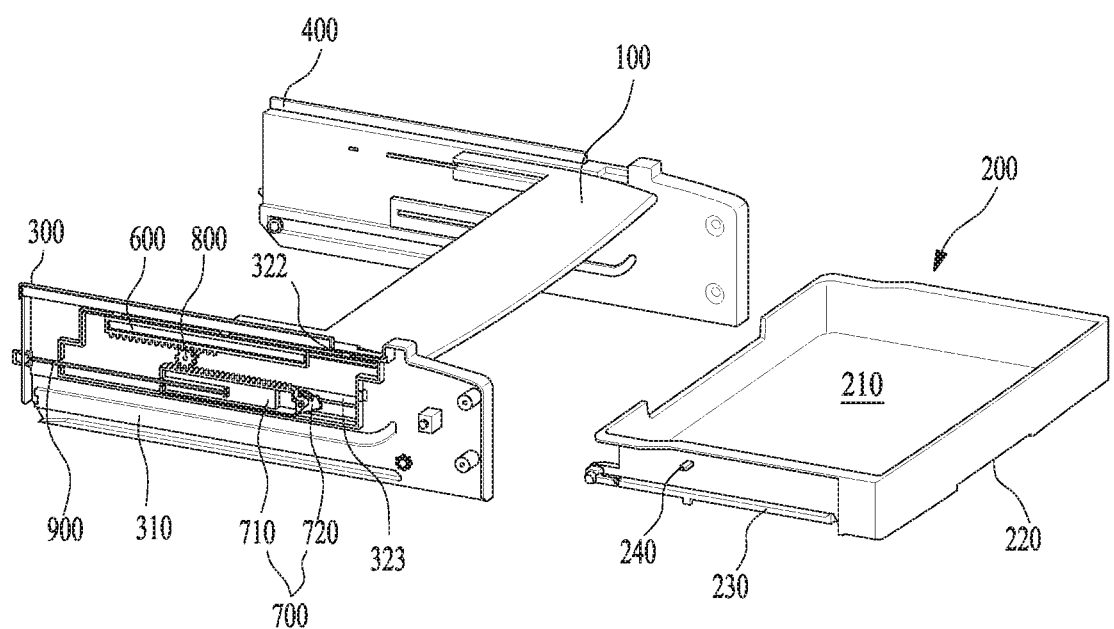
FIG. 4 is a perspective view illustrating an entire structure of a pantry assembly according to the embodiment of the present disclosure.
Figure 5:
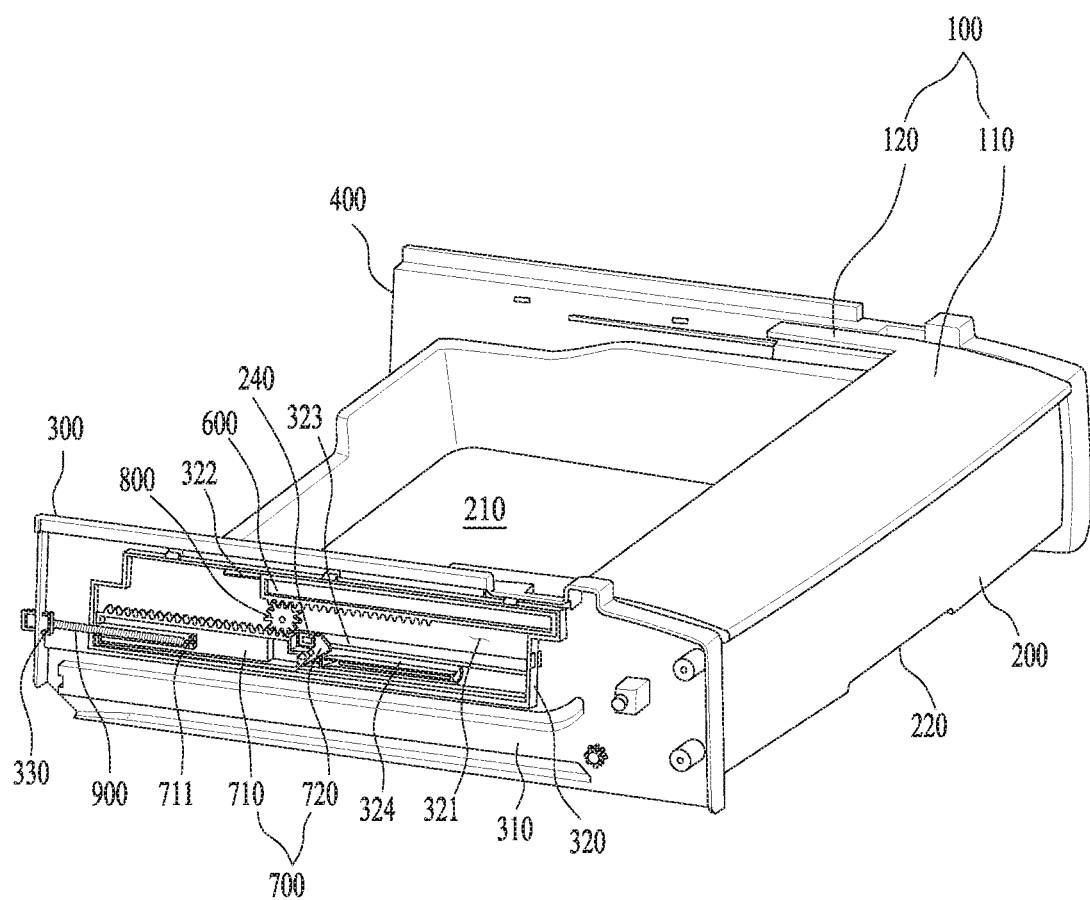
FIG. 5 is a perspective view illustrating a pantry assembly into which a storage member in FIG. 3 is inserted.
Figure 6:
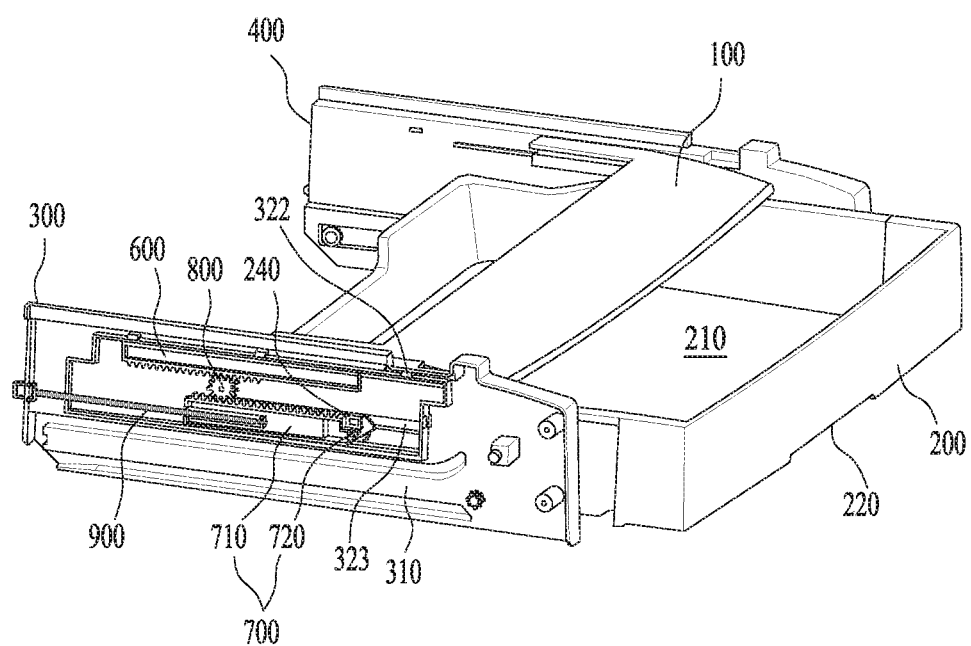
FIG. 6 is a perspective view illustrating a pantry assembly from which a storage member in FIG. 5 is drawn out.

FIG. 4 is a perspective view illustrating an entire structure of a pantry assembly according to the embodiment of the present disclosure, FIG. 5 is a perspective view illustrating a pantry assembly into which storage member in FIG. 3 is inserted, and FIG. 6 is a perspective view illustrating a pantry assembly from which storage member in FIG. 5 is drawn out. Referring to the drawings, the pantry assembly 50 may include the cover member 100, the storage member 200, the first support member 300 and the second support member 400.

The storage member 200 may be provided to form the storage space 210 opened upwardly, and may be provided with a manipulation unit 220 that is formed on the front surface to be gripped by the user for insertion and draw-out manipulation. The manipulation unit 220 may be formed to be recessed in a lower end of a front surface of the storage member 200.

The cover member 100 may include a cover member 110 for covering a front storage space 211 of the storage member 200, and an extension unit 120 extended from both rear ends of the cover member 110 to a backward direction. The extension unit 120 is a portion coupled to a first gear member 600 which will be described later, and will be described in more detail with reference to FIG. 9.

The pantry assembly 50 may include a driving unit (or driving assembly) 500 that enables movement of the cover member 100 when the storage member 200 is drawn out. The driving unit 500 may be provided in each of the first support member 300 and the fourth support member 400, and may be provided at outer surfaces of the support members 300 and 400, which correspond to an opposite side of a side toward the storage member 200 of the support members 300 and 400.

The driving unit 500 may include a second gear assembly 700 coupled to one side of the storage member 200 and moved to a moving direction of the storage member 200 when the storage member 200 is drawn out, a first gear member 600 coupled to one side of the cover member 100 and moved to an opposite direction of movement of the second gear assembly 700, and a connection gear 800 connecting the first gear member 600 with the second gear assembly 700 and moving the first gear member 600 and the second gear assembly 700 in an opposite direction.

The first support member 300 may be formed in a plate shape to cover the left side of the storage member 200. A rail unit 310 into which a rail coupling unit 230 of the storage member 200 is inserted may be formed at an inner side corresponding to a surface toward the storage member 200. The rail unit 310 forms a recessed space to allow the rail coupling unit 230 to be inserted thereinto, and may be extended forward and backward such that the storage member 200 may slidably be mounted on the rail unit 310. At this time, the recessed space of the rail unit 310 is opened forward to enable insertion of the rail coupling unit 230, and a front end of the recessed space may be formed to be up and down greater than the other portions, such that the rail coupling unit 230 may easily be inserted thereinto.

Meanwhile, a driving member mounting unit 230 on which the driving unit 500 is mounted may be formed on the outer side of the first support member 300. A recess 321 in which the driving unit 500 is received may be formed in the driving member mounting unit 230.

The recess 321 may be formed to be recessed to enable the operation of the driving unit 500 in a state that the driving unit 500 is received in the recess 321. As the driving unit 500 is received in the recess 321, when the first support member 300 is mounted at the inner sidewall of the refrigerating compartment 11, interference with the inner side of the refrigerating compartment 11 may be avoided.

A first guide 322 for providing a passage where the first gear member 600 and the cover member 100 are coupled to each other and guiding forward and backward movement of the first gear member 600 may be formed at the inner side of the recess 321. To this end, the first guide 322 may be provide with a first slot 322*a* formed by partially cutting the side of the first support member 300 and extended forward and backward.

A second guide 323 for providing a passage where the second gear assembly 700 and the storage member 200 are coupled to each other may be formed at the inner side of the recess 321. In detail, the second guide 323 may be formed to be recessed at the outside of the first support member 300 such that a binding member 720 of the second gear assembly 700, which will be described later, may be received therein and then guided.

The second guide 323 may be protruded from the inner side of the first support member 300. A second slot 323*a* extended forward and backward may be formed at the portion projected at the inner side of the first support member 300 by being cut. The second slot 323*a* provides a passage into which a gear operation unit 240 protruded from the side of the storage member 200 is inserted and the binding member 720 may be coupled, and may be provided to guide movement of the gear operation unit 240. At this time, an input and output opening 323b (FIG. 9) opened forward may be formed at the front end of the second slot 323a such that the gear operation unit 240 may be inserted into an inner side of the second slot 323a when the storage member 200 is inserted.

Meanwhile, a binding member guide 324 for guiding moving and rotation operation of the binding member 720 may be formed below the second guide 323 at the inner side of the recess 321. The binding member guide 324 will be described in detail with reference to FIG. 7.

Meanwhile, the first gear member 600 may be formed to be extended longitudinally forward and backward, and a rack gear may be formed at the lower end of the first gear member 600. The rack gear of the first gear member 600 may continuously be formed from the rear end to the front end of the first gear member 600. At this time, the rack gear of the first gear member 600 may continuously be formed as much as a length corresponding a moving distance of the cover member 100.

The second gear assembly 700 may include a second gear member 710 and a binding member 720 rotatably coupled to one side of the second gear member 710. The second gear member 710 may be formed to be extended longitudinally forward and backward, and a rack gear may be formed at its upper end. The rack gear of the second gear member 710 may continuously be formed from the front end of the second gear member 710 to the rear end thereof. At this time, the rack gear of the second gear member 710 may be formed continuously as much as a length corresponding the moving distance of the cover member 100.

The binding member 720 may rotatably coupled to the front end of the second gear member 710, and may be provided to be protruded toward the inner side of the recessed space of the second guide 323, thereby being received in the second guide 323. The binding member 720 may be provided to be selectively coupled to the gear operation unit 240 of the storage member 200 by rotation. Driving of the binding member 720 will be described in more detail with reference to FIGS. 7 and 8.

Meanwhile, the connection gear 800 may be provided rotatably between the first gear member 600 and the second gear member 710. The connection gear 800 may rotatably be fixed to the first support member 400 in an area between the first gear member 600 and the second gear member 710.

The connection gear 800 may be a pinion gear, and may be connected with a rack gear of the first gear member 600 and a rack gear of the second gear member 710. At this time, in a state that the storage member 200 is inserted at a maximum range, the connection gear 800 may be located such that a rear end of the rack gear of the first gear member 600 may be coupled to the connection gear 800 and a front end of the rack gear of the second gear member 710 may be coupled to the connection gear 800.

Therefore, if the second gear member 710 moves forward when the storage member 700 is drawn out, the first gear member 600 moves backward by means of rotation of the connection gear 800. Therefore, the cover member 100 coupled to the first gear member 600 moves backward when the storage member 700 is drawn out. If the second gear member 710 moves backward when the storage member 700 is inserted, the first gear member 600 moves forward by means of rotation of an opposite direction of the connection gear 800. Therefore, the cover member 100 moves forward when the storage member 700 is inserted.

Meanwhile, the driving unit 500 may further include an elastic member 900 that provides an elastic force to backward move the second gear assembly 700 coupled to the storage member 200. The elastic member 900 may provide an elastic force such that the storage member 200 may be inserted automatically at a predetermined position.

One end of the elastic member 900 may be fixed to one side of the second gear member 710, and the other end of the elastic member 900 may be fixed to one side of the rear end of the first support member 300. To this end, a first elastic member mounting unit 711 to which one end of the elastic member 900 is coupled may be formed in the second gear member 710. A second elastic member mounting unit 330 to which the other end of the elastic member 900 is coupled may be formed in the rear end of the first support member 300. Therefore, the elastic member 900 may be elongated when the storage member 200 is drawn out and thus the second gear member 710 moves forward, and may provide an elastic force such that the storage member 200 may be inserted automatically if the gear operation unit 240 and the binding member 720 are coupled to each other.

Figure 7:
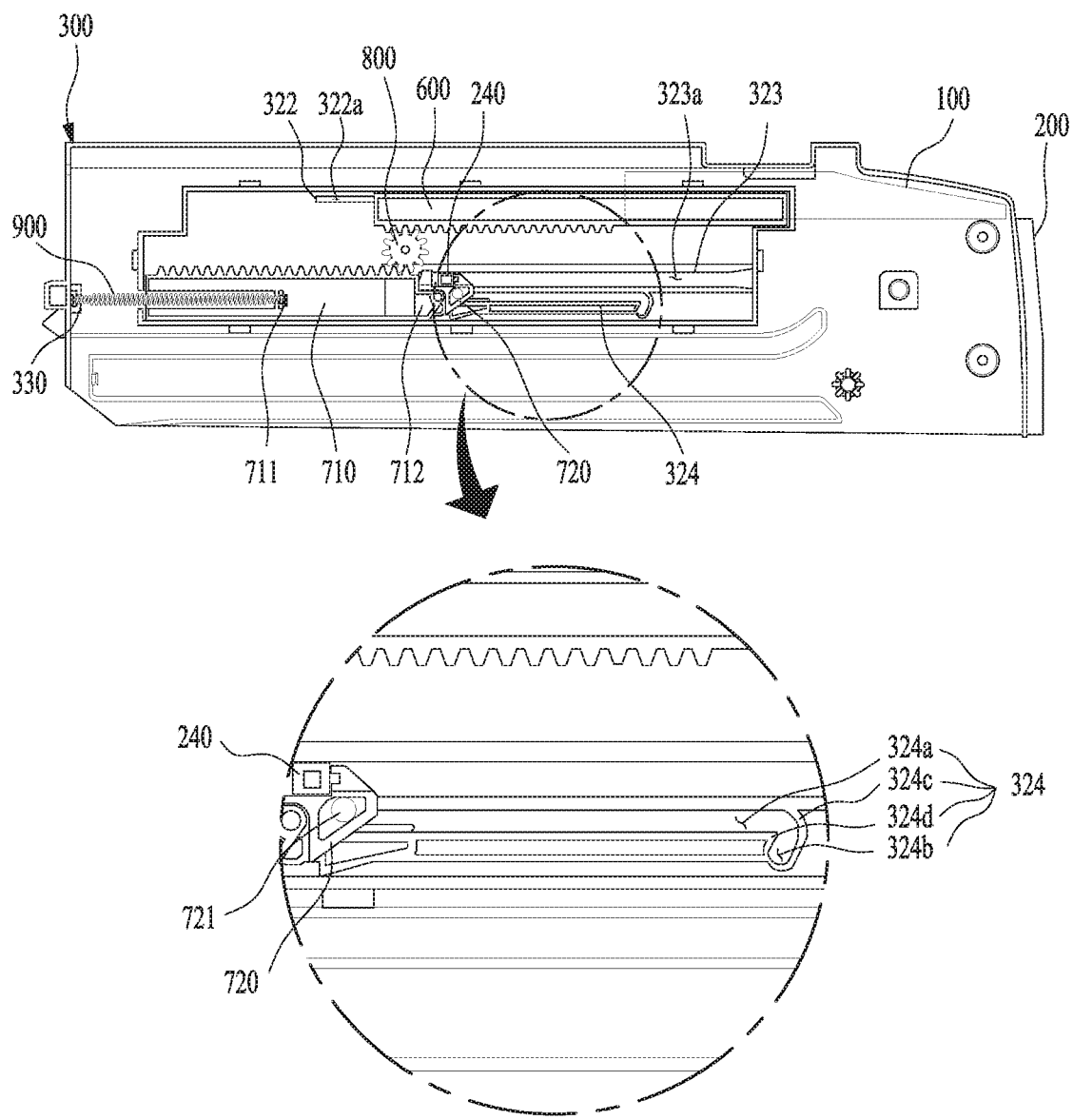
FIG. 7 is a left side view illustrating a pantry assembly into which a storage member according to the embodiment of the present disclosure is inserted.
Figure 8:
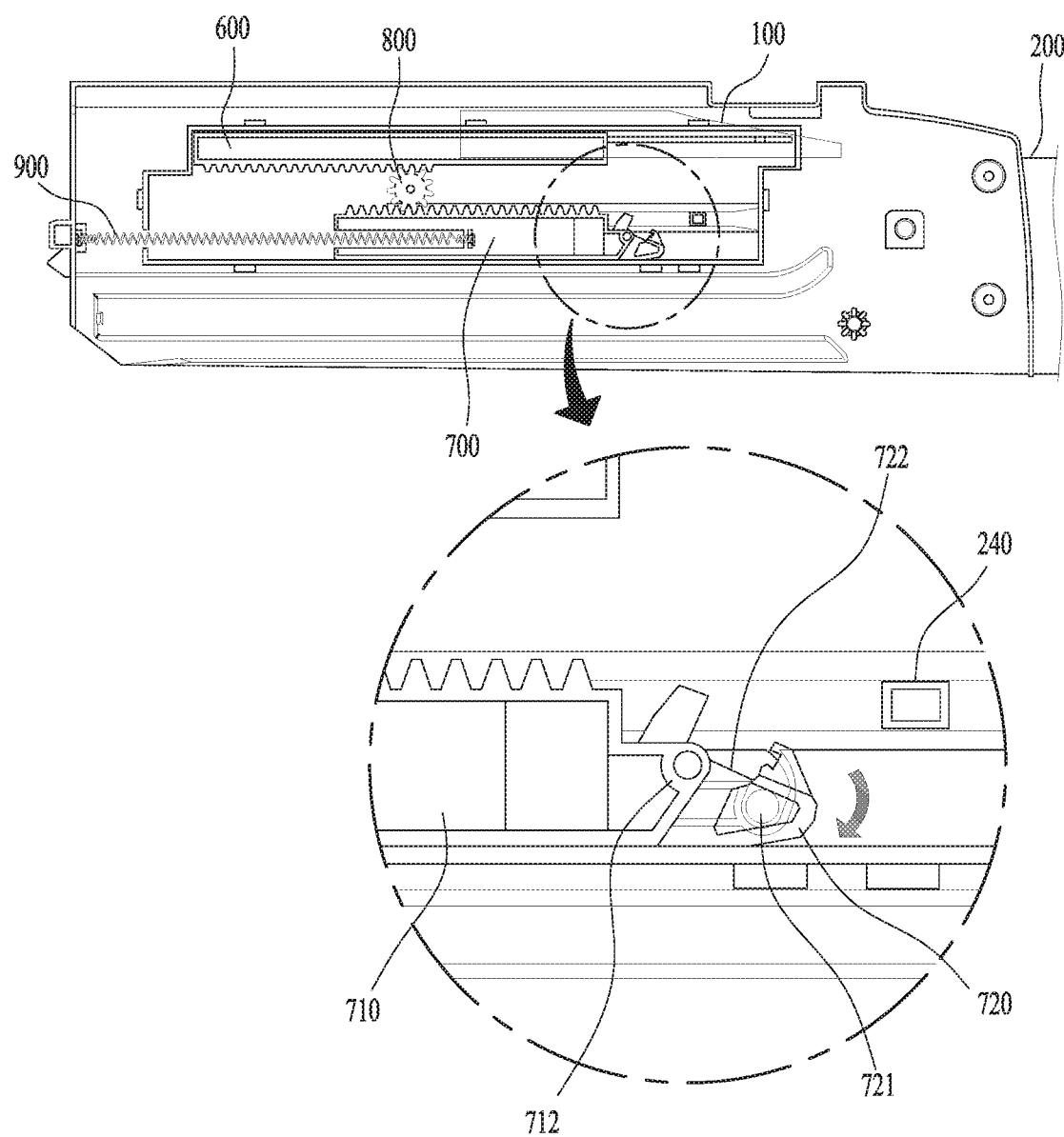
FIG. 8 is a left side view illustrating a pantry assembly from which a storage member according to the embodiment of the present disclosure is drawn out.

FIG. 7 is a left side view illustrating a pantry assembly into which a storage member according to the embodiment of the present disclosure is inserted, and FIG. 8 is a left side view illustrating a pantry assembly from which a storage member according to the embodiment of the present disclosure is drawn out. Referring to the drawings, the first gear member 600 may be located at an upper portion spaced apart from the second gear assembly 700 at a predetermined interval. The connection gear 800 may be formed to have an outer diameter corresponding to a spaced width between the first gear member 600 and the second gear assembly 700. The connection gear 800 may be connected with the first gear member 600 and the second gear member 710 between the first gear member 600 and the second gear member 710 by gear coupling.

In a state that the storage member 200 is inserted at a maximum range, the first gear member 600 may move forward at a maximum range, and the second gear assembly 700 may move backward at a maximum range. At this time, the rear portion of the rack gear of the first gear member 600 and the front portion of the rack gear of the second gear member 710 may be located to be partially overlapped with each other. The connection gear 800 may be connected with the rear portion of the rack gear of the first gear member 600 and the rear portion of the rack gear of the second gear member 710 by gear coupling. The binding member 720 may be coupled to the gear operation unit 240 of the storage member 200.

Therefore, in a state that the storage member 200 is inserted at a maximum range, the first gear member 600 may move immediately backward when the storage member 200 is drawn out. Therefore, the cover member 100 is inserted backward together with draw-out operation of the storage member 200.

Meanwhile, the binding member 720 may axially be coupled to a binding member mounting unit 712 formed at the front end of the second gear member 710, thereby being rotated up and down. A binding unit 722 recessed in a shape corresponding to the gear mounting unit 240 may be formed at the position corresponding to the gear operation unit 240 at an upper end of the binding member 720. Therefore, the in a state that the binding member 720 is rotated upwardly, the gear operation unit 240 may be inserted into the binding unit 722 and then coupled to the first gear assembly 700. If the binding member 720 is rotated downwardly, the gear operation unit 240 may be detached from the binding unit 722, whereby a coupling state with the first gear assembly 700 may be released.

Meanwhile, a binding member protrusion 721 received in the binding member guide 324 may be formed at one side of the binding member 720 forward spaced apart from the rotation center of the binding member 720. The binding member protrusion 721 may be protruded from the inner side of the binding member 720 headed for the binding member guide 324. Therefore, the binding member protrusion 721 may be inserted into the binding member guide 324, whereby forward and backward movement of the second gear assembly 700 may be guided by the binding member guide 324.

The binding member guide 324 may be formed to form a recessed space such that the binding member protrusion 721 may be inserted into the recessed space. The binding member guide 324 may include a moving guide 324a and a rotation guide 324b.

The moving guide 324a may provide a function of guiding forward and backward movement of the binding member 720 in a state that downward rotation of the binding member 720 is avoided. To this end, the moving guide 324a may be formed at the position corresponding to the binding member protrusion 721 in a state that the second gear assembly 700 moves backward at a maximum range and the binding member 720 is rotated upwardly, and may be formed to be extended forward.

Therefore, downward rotation operation of the binding member 720 may be bound as the binding member protrusion 721 is inserted into the moving guide 324a and then supported in the inner lower surface of the moving guide 324a. Forward movement of the binding member 720 may be guided in a state that downward rotation is bound when the second gear assembly moves forward, as the binding member protrusion 721 is guided by the moving guide 324a extended forward.

The rotation guide 324b may provide a function of releasing coupling with the storage member 200 by downwardly rotating the binding member 720 in a state that the storage member 200 is drawn out as much as a predetermined distance. To this end, the rotation guide 324b may be formed to be extended from the front end of the moving guide 324a to a downward direction.

In detail, the rotation guide 324b may be extended to be inclined toward a backward direction when it is extended from the front end of the moving guide 324a to the downward direction. The inner space of the rotation guide 324b may be communicated with the inner space of the moving guide 324a. A rounded round portion 324c may be formed at an upper side connected with the moving guide 324a at the inner side of the rotation guide 324b.

Therefore, if the binding member protrusion 721 moves forward along the moving guide 324a and then is located at the round portion 324c, the binding member protrusion 721 is guided by the round portion 324c and enters the rotation guide 324b. The binding member protrusion 721 is guided by the rotation guide 324b and then moves downwardly. Therefore, the binding member 720 is rotated downwardly, whereby the coupling state with the gear operation unit 240 may be released.

At this time, the rotation guide 324b may be extended to be inclined toward a backward direction when it is extended from the front end of the moving guide 324a to the downward direction. Therefore, a hook portion 324d protruded upwardly and forward may be formed at a lower side connected with the moving guide 324a at the inner side of the rotation guide 324b.

Therefore, in a state that the binding member is rotated downwardly, the binding member protrusion 721 is bound in the hook portion 324d, whereby the binding member 720 is maintained at a state that it is rotated downwardly. That is, the second gear assembly 700 may be maintained at a state that it moves forward without moving backward by means of an elastic force of the elastic member 900 in a state that the coupling with the storage member 200 is released as the binding member protrusion 721 is bound in the hook portion 324d.

Meanwhile, the binding member guide 324 may be formed longitudinally at a length corresponding to a moving distance of the cover member 100. That is, the rotation guide 324b may be located to correspond to the position of the binding member protrusion 721 in a state that the cover member 100 moves backward at a maximum range. Therefore, the storage member 200 is drawn out, the storage member 200 is coupled with the binding member 720 until the cover member 100 moves backward at a maximum range, whereby the cover member 100 moves. In a state that the cover member 100 moves backward at a maximum range, the coupling with the binding member 720 is released, whereby the storage member 200 may be drawn out forward.

At this time, the first gear member 600 may move backward at a maximum range, and the second gear assembly 700 may move forward at a maximum range. The connection gear 800 may be located at the front end of the rack gear of the first gear member 600 and the rear end of the rack gear of the second gear member 710. In a state that the storage member 200 is drawn out to release the coupling with the binding member 720, the second gear assembly 700 moves forward and then maintains a fixed state as the binding member protrusion 721 is bound in the hook portion 324d.

Meanwhile, when the storage member 200 inserted backward, the gear operation unit 240 is in contact with one side of the binding member 722, whereby the binding member protrusion 721 may be released from the hook portion 324d. Therefore, the binding member 720 is rotated upwardly by contact with the gear operation unit 240, whereby the binding member 720 may be coupled with the gear operation unit 240. The second gear assembly 700 coupled with the storage member 200 is forcibly moved backward by the elastic force of the elastic member 900. Therefore, the storage member 200 may easily be inserted automatically backward by the elastic force of the elastic member 900.

Particularly, in the structure of the second gear assembly, the binding member 720 is rotatably provided up and down and then is able to be selectively coupled with the gear operation unit 240 by up and down rotation. That is, the binding member 720 is rotated in a downward direction corresponding to a direction on which gravity acts, whereby the binding member 720 is released from the gear operation unit 240. The binding member protrusion 721 is located in the rotation guide 324b and then bound in the hook portion 324d. Therefore, the binding member protrusion 721 may stably be guided by the rotation guide 324b by gravity when the storage member 200 is drawn out, whereby the binding member protrusion 721 may move downwardly. The binding member 720 may downwardly be rotated more stably. The binding member protrusion 721 may more stably maintain the state that it is bound in the hook portion 324d at the inner side of the rotation guide 324*b*, by means of gravity. Therefore, stable operation of the pantry assembly 50 may be ensured.

Figure 9:
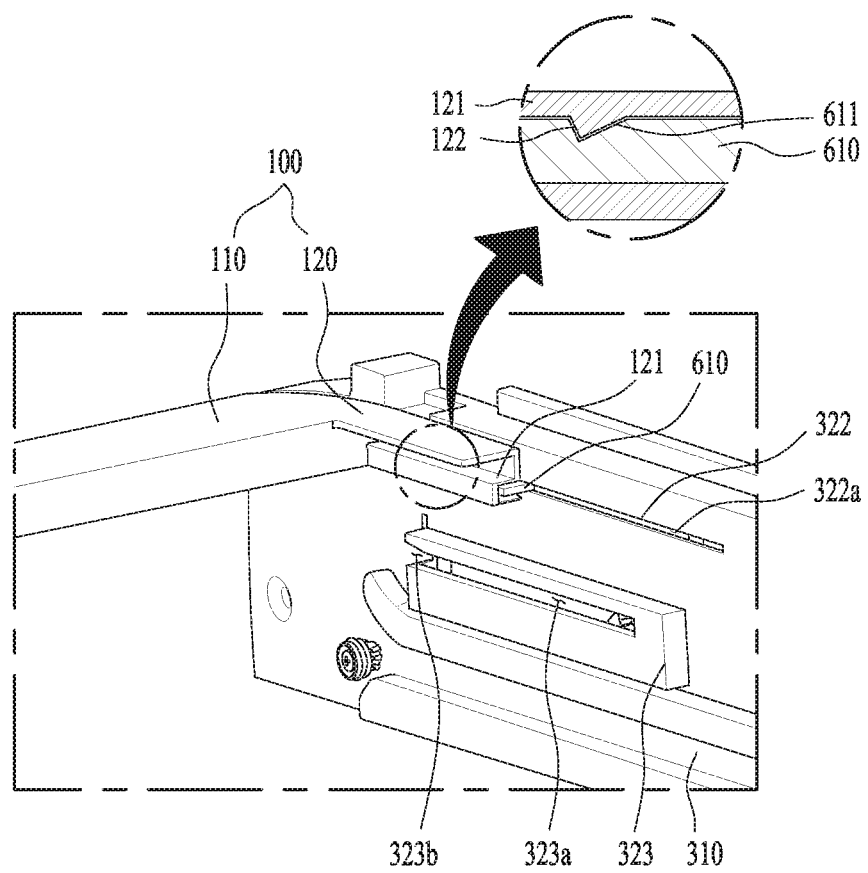
FIG. 9 is a view illustrating an inner structure of a support member according to the embodiment of the present disclosure.

FIG. 9 is a view illustrating an inner structure of a support member according to the embodiment of the present disclosure. Referring to FIG. 9, the rail unit 310 into which the rail coupling unit 230 of the storage member 200 is inserted may be formed at the inner side of the first support member 300. The rail unit 310 forms a recessed space such that the rail coupling unit 230 may be inserted into the recessed space, and may be formed to be extended forward and backward. The recessed space of the rail unit 310 may be opened forward to enable insertion of the rail coupling unit 230. A front end of the recessed space may be formed to be greater than the other portion up and down, thereby facilitating insertion of the rail coupling unit 230.

Meanwhile, the second guide 323 may be formed to be protruded from the inner side of the first support member 300. A second slot 323*a* extended forward and backward may be formed to be cut at the portion where the second guide 323 is protruded toward the inner side of the first support member 300.

The gear operation unit 240 may be inserted into the second slot 323*a* to provide a passage where the gear operation unit 240 may be coupled with the binding member 720. The second slot 323*a* may be provided to guide movement of the gear operation unit 240. To this end, an input and output opening 323*b* opened forward may be formed at the front end of the second slot 323*a* such that the gear operation unit 240 may be inserted into the second slot 323*a* when the storage member 200 is inserted. Meanwhile, the first slot 322*a* that provides a passage where the first gear member 600 is coupled with the cover member 100 and guides forward and backward movement of the first gear member 600 may be formed to be cut at the upper portion inside the first support member 300.

A cover coupling unit 610 protruded toward the inner side of the first support member 300 by passing through the first slot 322*a* may be formed in the first gear member 600. A first gear mounting unit to which the cover coupling unit 610 is coupled may be formed at both sides of the cover member 100.

The first gear mounting unit 121 may be formed outside the extension unit 120 of the cover member 100, and may be recessed in a shape corresponding to the cover coupling unit 610 so that the cover coupling unit 610 may be inserted into the first gear mounting unit 121. The first gear mounting unit 121 may be formed to be opened backward such that the cover coupling unit 610 may be inserted thereinto by slidably inserting the cover member 100 from the front.

Meanwhile, the first gear mounting unit 121 may be fixed to the protrusion of the cover coupling unit 610 by a coupling structure of a groove. For example, a hook protrusion 122 protruded downwardly may be formed on the upper surface inside the first gear mounting unit 121. A hook groove 611 into which the hook protrusion 122 is inserted and then bound may be formed at a position corresponding to the hook protrusion 122 on the cover coupling unit 610. Therefore, if the cover coupling unit 610 is inserted into the first gear mounting unit 121 by sliding insertion of the cover member 100 from the front, the cover member 100 and the first gear member 600 are easily coupled with each other by coupling of the hook protrusion 122 and the hook groove 611.

Hereinafter, the refrigerator according to another embodiment of the present disclosure will be described in detail with reference to FIGS. 10 to 17. The storage device and the pantry assembly in this embodiment may be similar to those of the aforementioned embodiment. The storage device and the pantry assembly in this embodiment may be different from those of the aforementioned embodiment in ascending of the cover member. That is, in this embodiment unlike the aforementioned embodiment, the front end (portion where the cover member is located at the front when covering the front of the storage member) of the cover member ascends when the cover member moves backward.

Figure 10:
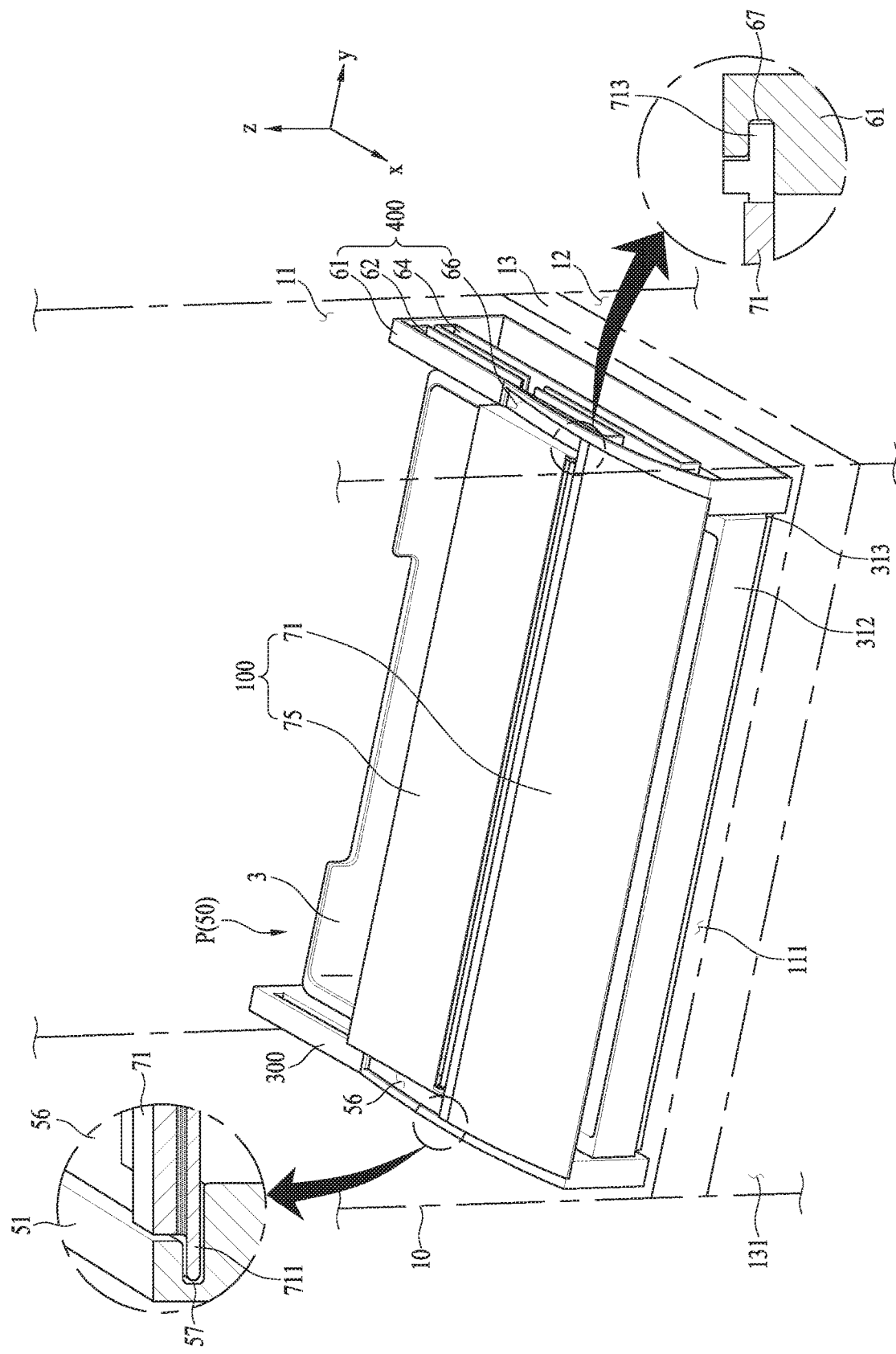
FIG. 10 is a view illustrating an example of a refrigerator according to another embodiment of the present disclosure.

Elements shown in FIGS. 10 to 17 may be described as reference numerals different from those of the aforementioned embodiment even though the elements are the same as or similar to those of the aforementioned embodiment. As shown in FIG. 10, the refrigerator of the present disclosure may comprise storage spaces 11 and 12 provided in the cabinet, providing spaces in which storage goods (refrigerating targets or freezing targets) are received, and a heat exchanger 2 (see FIG. 15) for exchanging heat with the air inside the storage spaces.

The storage spaces may be provided inside the cabinet 10 in a plural number. FIG. 10 illustrates an example that the storage spaces are categorized into a first space 11 and a second space 12. If the storage spaces are partitioned into the first space 11 and the second space 12, the first space 11 may be provided as any one of the refrigerating compartment for refrigerating the storage goods and the freezing compartment for freezing the storage goods, and the second space 12 may be provided as the other one of the refrigerating compartment and the freezing compartment. In this case, the first space 11 and the second space 12 may be partitioned from each other through a barrier 13. However, the first space and the second space may be provided to partition one space controlled by the same temperature. That is, both the first space and the second space may be provided as the refrigerating compartment or the freezing compartment.

Each of the spaces 11 and 12 may be provided with an opened surface for drawing the storage goods out toward the outside of the cabinet 10. That is, the first space 11 may be provided to be communicated with the outside of the cabinet 10 through a first opened surface 111, and the second space may be provided to be communicated with the outside of the cabinet through a second opened surface 131.

The first opened surface 111 and the second opened surface 131 may be provided to be opened or closed by the door. That is, the first opened surface 111 may be provided to be opened or closed by one door, or may be provided to be opened or closed by the pair of doors 21 respectively provided at both ends which face each other (see FIGS. 15 and 17). Although not shown, the second opened surface 131 may be provided to be opened or closed by one door, or may be provided to be opened or closed by the pair of doors respectively provided at both ends which face each other.

The heat exchanger 2 (see FIG. 15) may include a compressor 21A for compressing a refrigerant, a condenser 23A for condensing a refrigerant discharged from the compressor by heat-exchanging the refrigerant with the external air of the cabinet, an expansion valve 25A for lowering a pressure of the refrigerant discharged from the condenser, and an evaporator 27A for evaporating the refrigerant by heat-exchanging the refrigerant, which has passed through the expansion valve, with the air of the storage spaces 11 and 12. Since the evaporator absorbs heat from the air inside the storage space, the air circulating inside the storage space is cooled while passing through the evaporator. Therefore, the heat exchanger may control temperatures of the first space 11 and the second space 12 to be lower than a room temperature.

To efficiently use the aforementioned storage spaces, a storage device P is further provided in at least any one of the first space 11 and the second space 12. FIG. 10 illustrates an example that the storage device P is provided in the first space 11. Although FIG. 10 illustrates that the storage device P is supported by the barrier 13, if a rack (rack which may support a drawer provided in the storage device), which may support a lower portion of the storage device P, exists in the first space 11 or the second space 12, the storage device P may be provided to be supported in the rack provided in the first space or the second space not the barrier 13.

Hereinafter, for convenience of description, description will be given based on the storage device P provided in the first space 11, having a lower surface supported by the barrier 13. The storage device P includes a storage member or drawer 3 provided in the first space 11 to provide a space where storage goods are received, and supported by the barrier 13, and first and second support members 300 and 400 for providing a moving path of the drawer 3.

Figure 11:
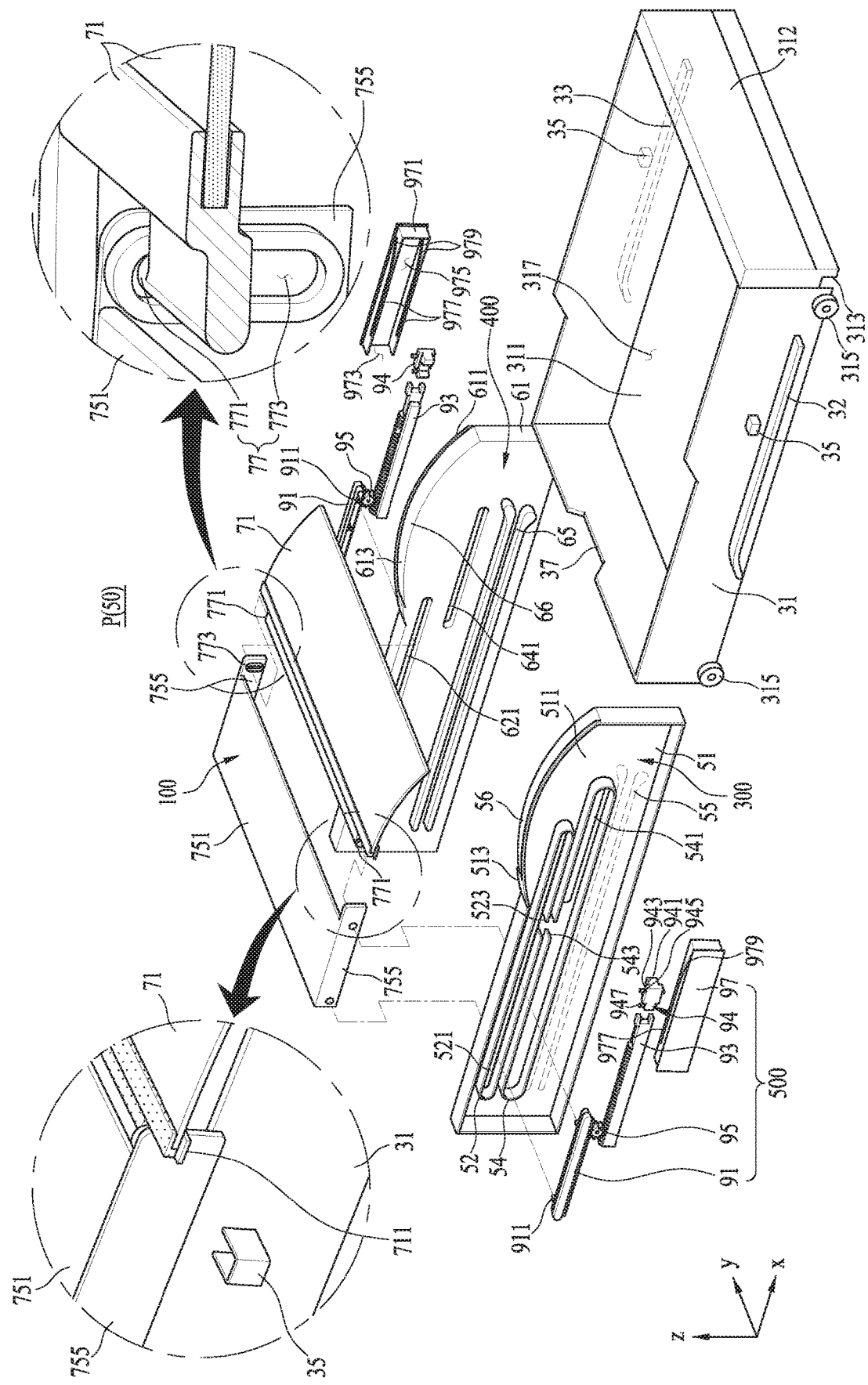
FIGS. 11 and 12 are views illustrating examples of a storage device (pantry assembly) according to another embodiment of the present disclosure.

As shown in FIG. 11, the drawer 3 includes a drawer body 31 includes a drawer body 31 may be drawn out of the first space 11 through the first opened surface 111, and a storage unit 311 provided in the drawer body 31, in which storage goods are stored. The storage unit 311 may be communicated with the outside of the drawer body 31 through an inlet 317 formed on an upper surface of the drawer body 31, and the user may insert the storage goods or draw the storage goods out of the storage unit 311.

Meanwhile, a front panel 312 may be provided on a front surface (one surface of the drawer body toward the first opened surface) of the drawer body 31, and a handle 313, which may allow the user to draw out the drawer body 31, may be provided on the front panel 312. Moreover, at least partial area of the front panel 312 may be made of a transparent material. This is to identify the inside of the storage unit 311 at the front of the drawer body 31.

A plurality of rollers 315 may further be provided on the bottom of the drawer body 31 to easily draw or insert the drawer body 31 out of or into the first space 11. The rollers 315 may rotatably be provided anywhere in the drawer body 31 as far as the drawer body 31 may be supported in the barrier 13.

The first support member 300 and the second support member 400 may respectively be provided at both ends of the drawer body 31, which face each other. That is, the first support member 300 may be provided to include a first body 51 provided along a direction in parallel with a moving direction of the drawer body 31, and the second support member 400 may be provided to include a second body 61 provided along a direction in parallel with a moving direction of the drawer body 31.

The drawer 3 includes a first rail coupling unit 32 protruded toward the first body 51 on the surface of the drawer body 31, and a second rail coupling unit 33 protruded toward the second body 61 on the surface of the drawer body 31, and the first body 51 and the second body 61 may be provided with rail units 55 and 65 that provide a moving path (path where the drawer body is drawn out of or inserted into the first space) of the rail coupling units 32 and 33.

That is, the first body 51 may include the first rail unit 55, which provides a moving path of the first rail coupling unit 32, and the second body 61 may include the second rail unit 65 that provides a moving path of the second rail coupling unit 33. As shown in FIG. 11, the rail coupling units 32 and 33 may be provided in the first body 51 and the second body 61, and the first rail unit 55 and the second rail unit 65 may be provided on both sides of the drawer body 31, which face each other.

The cover member 100 for opening or closing the inlet 317 is provided at the upper portion of the drawer body 31, and the cover member 100 opens or closes the inlet 317 through the driving unit 500. The cover member 100 is supported by the first support member 300 and the second support member 400 and thus is located at the upper portion of the inlet 317, and the driving unit 500 exposes the inlet 317 by moving the cover member 100 in an opposite direction of the moving direction of the drawer body 31.

The cover member 100 includes a cover member body (or cover plate) 71 supported by the first body 51 and the second body 61, a moving unit (or moving assembly) 75 moving in an opposite direction of the moving direction of the drawer body 31 through the driving unit 500, and a fastening unit (or fastener) 77 for connecting the cover member body 71 with the moving unit 75. The cover member body 71 may be made of a transparent material to allow the user to identify the inside of the storage unit 311 from the outside. A reference position of the cover member body 71 is the front of the inlet 317. The reference position means the position (position of the cover member body when the drawer body 31 is located inside the first space 11) of the cover member body 71 when the drawer body 31 is not drawn out of the first space 11, and the cover member body 71 is provided to close the front space of the inlet 317 at the reference position.

Cover member flanges (or cover flange) 711 and 713 (see FIG. 10) for supporting the cover member body 71 in the first body 51 and the second body 61 are provided in the cover member body 71. The cover member flanges 711 may be categorized into the first cover member flange 711 supported in the first body 51, and the second cover member flange 713 supported in the second body 61. In this case, the first body 51 may further include a flange storage groove 57 (see FIG. 10) in which the first cover member flange 711 is received, and the second body 61 may further include a flange storage groove 67 (see FIG. 10) in which the second cover member flange 713 is received.

The moving unit 75 may be provided in all shapes that may connect the driving unit 500 with the cover member body 71. In FIG. 11, the moving unit 75 includes a moving body (or moving plate) 751 provided to form a plane parallel with the inlet 317 and a bending unit (or extensions) 755 to which the driving unit 500 is coupled by bending of both ends of the moving body 751, which face each other.

The fastening unit 77 may include a protrusion 771 provided in any one of the cover member body 71 and the moving body 751, and a slot 773 provided in the other one of the cover member body 71 and the moving body 751, for receiving the protrusion 771. FIG. 11 illustrates an example that the protrusion 771 is provided in the cover member body 71, and the slot 773 is provided in the bending unit 755 of the moving body. The slot 773 may be provided along a height direction (Z-axis direction) of the bending unit 771 such that the protrusion 771 may move along a height direction (Z-axis direction) of the drawer body 31. This is to allow the cover member body 71 to move along the height direction of the drawer body 31 if the cover member body 71 is provided as a curved surface.

The driving unit 500 may include a first gear 91 supported in the first body 51 and fixed to the moving unit 75, a second gear 93 supported in the first body 51 and fixed to the drawer body 31, and a connection gear 95 rotatably provided between the first gear 91 and the second gear 93, connecting the first gear 91 with the second gear 93. The connection gear 95 may rotatably be fixed to the first body 51.

The first gear 91 may be provided as a rack gear movably provided along a direction parallel with the moving direction (X-axis direction) of the cover member body 71, and the second gear 93 may be provided as a rack gear movably provided along a direction parallel with the moving direction (X-axis direction) of the drawer body 31. In this case, the connection gear 95 may be provided as a pinion.

Therefore, the driving unit 500 becomes a mechanism for moving (X-axis direction) the cover member body 71 to expose the inlet 317 if the drawer body 31 moves along a direction (X-axis direction) of the first opened surface 111 and moving (X-axis direction) the cover member body 71 so as not to expose the inlet 317 if the drawer body 31 moves along a direction (X-axis direction) far away from the first opened surface 111. Since the driving unit 500 that may be applied to the embodiment of the present disclosure moves the cover member body 71 in an opposite direction of the moving direction of the drawer body 31, it is possible to maximize the exposed area of the inlet 317 even though the drawer body 31 moves only a little.

Unlike the aforementioned description, it is assumed that the cover member 100 is fixed to the upper portion of the drawer body 31 and the drawer body 31 may be drawn out of the first space 11. The user should expose the inlet 317 to insert or draw the storage goods into or out of the storage unit 311, and should draw the drawer body 31 out of the first space 11 to expose the inlet 317.

In this case, the area where the inlet 317 is externally exposed may be the same as the area where the user draws the drawer body 31 out of the first space 11. Therefore, the user should more and more draw the drawer body 31 out of the first space 11 if the volume of the storage goods becomes great when inserting or drawing the storage goods into or out of the storage unit 311.

However, since the driving unit 500 that may be applied to the embodiment of the present disclosure moves the cover member body 71 in an opposite direction of the moving direction of the drawer body 31, the inlet 317 may be exposed as much as a sum of an area of the inlet 317 exposed as the drawer body 31 is drawn out of the first space 11 and an area of the inlet 317 exposed as the cover member body 71 moves along the inside of the first space 11.

Therefore, according one embodiment of the present disclosure, since the inlet 317 may be exposed at an area greater than the upper area of the drawer body 31 exposed as the drawer body 31 is drawn out of the first space 11, convenience may be provided to the user when the user inserts or draws the storage goods into or out of the storage unit 311. That is, according to one embodiment of the present disclosure, since the inlet 317 is exposed at an area greater than the upper area of the drawer body 31 exposed as the drawer body 31 is drawn out of the first space 11, it is convenient when the user inserts or draws storage goods having a great volume into or out of the storage unit 311.

The first gear 91, the second gear 93 and the connection gear 95 may be provided only in any one of the first support member 300 and the second support member 400. However, since a moving distance of one surface of the moving body 751 which is in contact with the first body 51 should be the same as a moving distance of one surface of the moving body 751 which is in contact with the second body 62, it is preferable that the first gear, the second gear and the connection gear are respectively provided in the first body 51 of the first support member and the second body 61 of the second support member.

If the driving unit 500 is respectively provided in the first support member 300 and the second support member 400, a first gear guider (or first gear guide) 52 (first support first gear guider) for providing a moving path of the first gear 92 and a second gear guider (or second gear guide) 54 (first support second gear guider) for providing a moving path of the second gear 93 may be provided in the first body 51, and a first gear guider 62 (second support first gear guider, see FIG. 10) for providing a moving path of the second gear 93 and a second gear guider 64 (second support second gear guider, see FIG. 10) for providing a moving path of the second gear 93 may be provided in the second body 61.

The first gear guiders 52 and 62 and the second gear guiders 54 and 64 may be provided on a surface toward the drawer body 31 from both surfaces of the first body 51 and the second body 61, or may be provided on an opposite side toward the drawer body 31. If the first gear guiders 52 and 62 and the second gear guiders 54 and 64 are respectively provided on one surface of the first body 51 and one surface of the second body 61 toward the drawer body 31, the connection gear 95 should rotatably be fixed to one surface of the first body 51 and one surface of the second body 61 toward the drawer body 31.

Meanwhile, the first gear guider 52 and the second gear guider 54 of the first support unit 5 may be provided on the opposite side of the side toward the drawer body 31 of the area of the first body 51, and the first gear guider 62 and the second gear guider 64 of the second support unit 5 may be provided on the opposite side of the side toward the drawer body 31 of the area of the second body 61 (FIG. 11). In this case, the first gear 91 should be connected to the moving body 751 through a first connector 911, and the second gear 93 should be connected to the drawer body 31 through a second connector 94. Therefore, a first slot 521A provided along a direction parallel with a moving direction of the cover member body 71, for providing a moving path of the first connector 911 should be provided inside the first gear guider 52 of the first support unit, and a second slot 541 provided along a direction parallel with a moving direction of the drawer body 31, for providing a moving path of the second connector 94 should be provided inside the second gear guider 62 of the second support unit. Likewise, a first slot 621A for providing a moving path of the first connector 922 should be provided in the first gear guider 62 of the second support unit 6, and a second slot 641 for providing a moving path of the second connector 94 should be provided in the second gear guider 64 of the second support unit.

The first gear guiders 52 and 62 and the second gear guiders 54 and 64 may be provided in all shapes that may implement the aforementioned function. In FIGS. 10 and 11, as an example, the first gear guiders 52 and 62 are provided to surround the first gear 91, thereby providing the moving path of the first gear 91, and the second gear guiders 54 and 64 are provided to surround the second gear 93, thereby providing the moving path of the second gear 93.

In this case, a first communication unit 523A for coupling the connection gear 95 to the first gear 91 may be provided in the first gear guider 52 of the first support unit, and a second communication unit 543 for coupling the connection gear 95 to the second gear 93 may be provided in the second gear guider 54 of the first support unit. The first gear guider 62 and the second gear guider 64 of the second support unit are provided in the same structure.

Meanwhile, according to one embodiment of the present disclosure, to more enlarge the area of the inlet 317 opened by the cover member body 71, first curved portions (or first curved regions) 511 and 513 may be provided on the upper surface of the first body 51, and second curved portions (or second curved regions) 611 and 613 may be provided on the upper surface of the second body 61. The first curved portion may include a first front curved portion 511 located at the front on the upper surface of the first body 51 and a first rear curved portion 513 extended from the first front curved portion 511 to the rear of the upper surface of the first body 51, and the second curved portion may include a second front curved portion 611 located at the front on the upper surface of the second body 61 and a second rear curved portion 613 extended from the second front curved portion 611 to the rear of the upper surface of the second body 61. In this case, the first front curved portion 511 and the second front curved portion 611 may be provided to have the same curvature, and the cover member body 71 may be provided as a curved surface having the same curvature as that of the first front curved portion and the second front curved portion.

Figure 12:
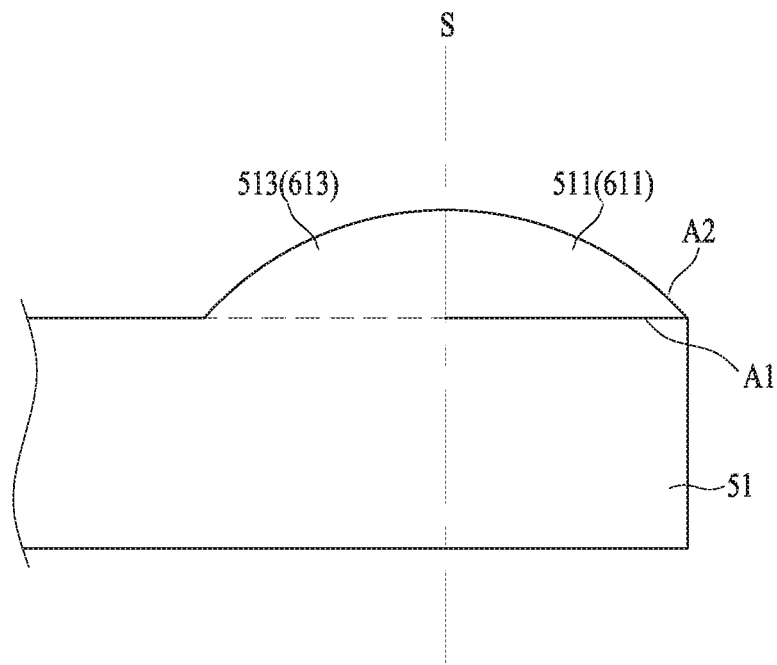

As shown in FIG. 12, if the curved portions 511 and 611 are provided at the front on the upper surfaces of the bodies 51 and 61, when the cover member body 71 moves to the rear of the first space 11 as much as the same distance S, the exposed area A1 of the inlet corresponding to the case that the curved portion is not provided is greater than the exposed area A2 of the inlet corresponding to the case that the curved portion is provided. Therefore, the first front curved portion 511 and the second front curved portion 611 become a mechanism for maximizing the exposed area of the inlet 317 inside the first space 11 of which volume is limited.

Meanwhile, a case that the drawer body 31 should be detached from the first space 11 may occur in the storage device P having the aforementioned structure. In order that the drawer body 31 is detached from the first space 11, it is preferable that the second connector 94 is detachably provided in the drawer body 31.

Figure 13:
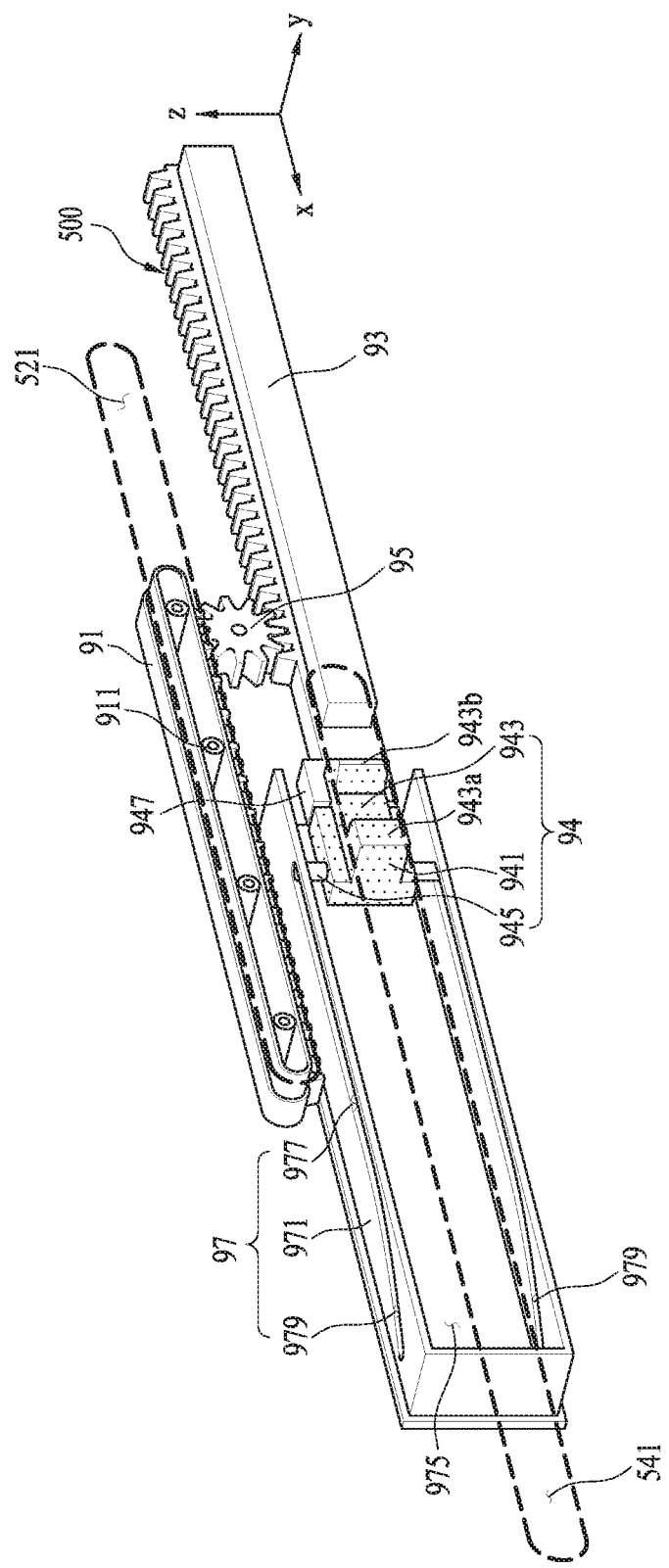
FIG. 13 is a view illustrating an example of a driving unit provided in a storage device shown in FIG. 11.

As shown in FIG. 11, the second connector 94 may be provided to further include a detachable body 941 to which the drawer body 31 is detachably coupled, and a connector guider (or connector guide) 97 for detaching the detachable body 941 from the drawer 31 when the drawer body 31 is drawn out of the first space 11. As shown in FIG. 13, the detachable body 941 is inserted into the second slot 541 and moves along the inside of the second slot 541, wherein detachable body 941 is connected to the second gear 93 through a hinge 947 and coupled to the connector guider 97 through a coupling axis 945.

A gear operation unit detachably coupled to the detachable body 941 is provided in the drawer body 31, and may be provided as a groove provided as the drawer body 31 is concavely bent, or may be provided as a protrusion (see FIG. 11) protruded from the drawer body 31 toward the first body 51. FIG. 13 illustrates an example of the detachable body 941 when the gear operation unit (or gear operation protrusion) 35 is provided in a shape protruded from the drawer body 31 to the first body 51. In this case, a groove 943 to which the gear operation unit 35 is detachably coupled is provided in the detachable body 941.

The groove 943 is provided to be fixed to the detachable body 941, and may be formed by a first stopper 943a and a second stopper 943b, which are spaced apart from each other as much as a space in which the gear operation unit 35 may be received. The first stopper 943a is defined as a stopper close to the first opened surface 11 out of which the drawer body 31 is drawn, and the second stopper 943b is defined as a stopper provided to be further away from the first opened surface 111 than the first stopper 943a.

The connector guider 97 is a mechanism for moving the coupling axis 945 to allow the first stopper 943a located to be close to the first opened surface 111 to be far away from the drawer body 31 if the drawer body 31 is drawn out of the first space 11 at a preset reference distance L (see FIG. 15) or more.

The connector guider 97 may include a guider body (or guide body) 971 provided inside the second gear guider 54, having a first surface 973 (see FIG. 11) and a second surface 975, and axis guiders (or axis guides) 977 and 979 provided in the guider body 971 to allow the coupling axis 945 to be inserted thereinto. The first surface 973 is an opened surface for allowing the detachable body 942 provided inside the guider body 971 to be connected with the second gear 93, and the second surface 975 is an opened surface for allowing the detachable body 974 to be inserted into the second slot 541.

Meanwhile, the axis guiders are provided as the first axis guider (or first axis guide) 977 and the second axis guider (or first axis guide) 979 provided to pass through the guider body 971, wherein the first axis guider 977 is provided in parallel with the moving direction of the drawer body 31 and the second axis guider 979 is provided to be extended from the first axis guider and far away from the drawer body toward the first opened surface 111. Unlike the aforementioned description, the connector guider 97 may be implemented in such a manner that the first axis guider 977 and the second axis guider 979 are provided in the second gear guider 54.

Figure 14:
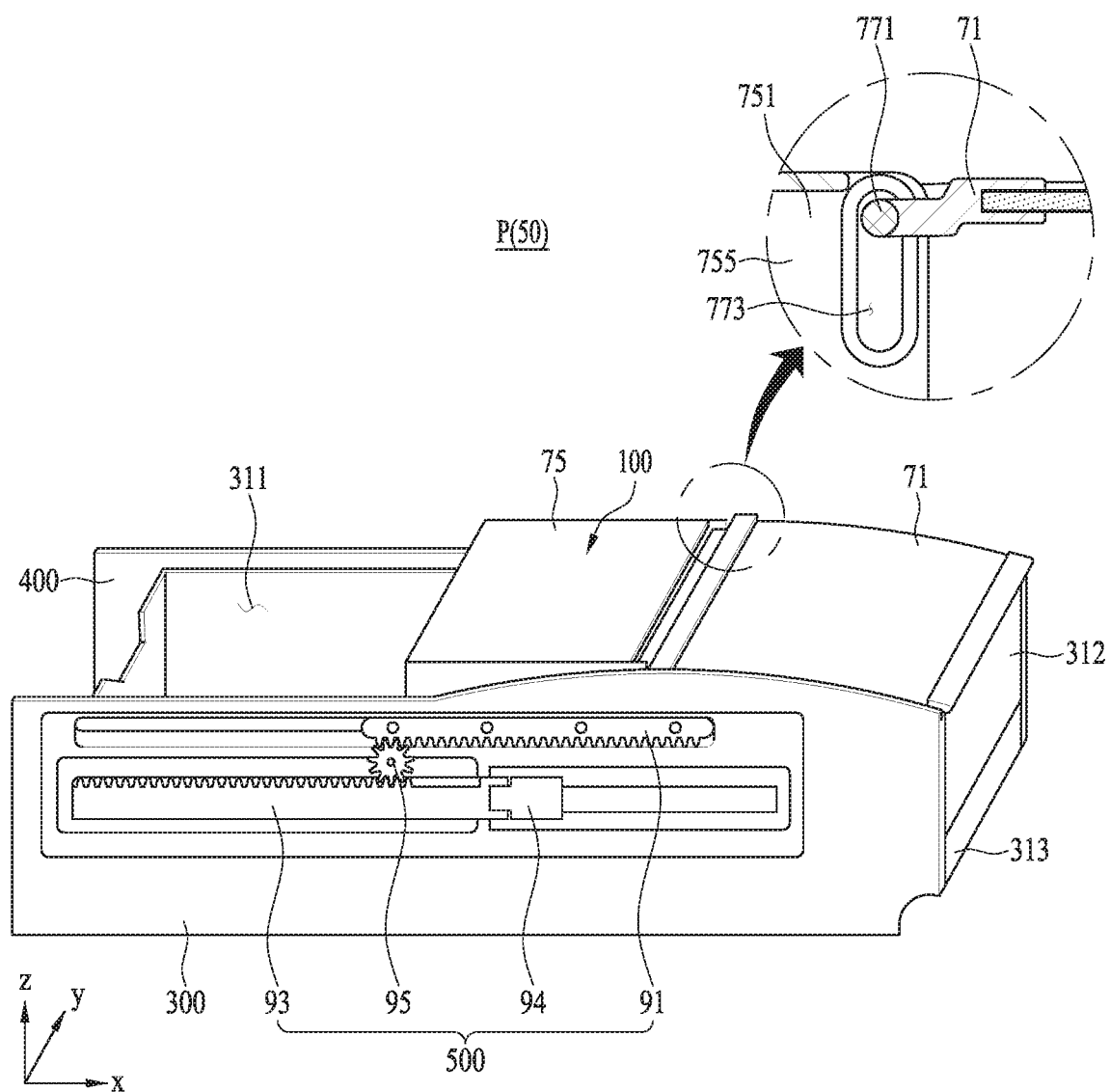
FIGS. 14 and 15 are views illustrating that a drawer provided in the storage device shown in FIG. 11 is arranged in a storage space.

Hereinafter, the operation procedure of the storage device P according to the embodiment of the present disclosure will be described with reference to FIGS. 14 to 17. FIG. 14 illustrates that the drawer body 31 is not drawn out of the first space 11. In this case, since the cover member body 71 is at the reference position, a front space of the inlet 317 of the storage unit is not exposed externally by the cover member body 71.

Since the cover member body 71 and the moving unit 75 should reciprocate at the upper portion of the drawer body 31, a sum of lengths of the cover member body 71 and the moving body 751 with respect to the draw-out direction (X-axis direction) of the drawer body 31 is shorter than the length of the inlet 317 with respect to the draw-out direction of the drawer body 31. Therefore, the air supplied to the first space 11 through the heat exchanger 2 (see FIG. 15) will be supplied into the storage unit 311 through the space formed at the rear of the moving body 751. In order that the air supplied through the heat exchanger 2 enters the storage unit 311 more easily, a storage space communication unit 37 may further be provided on a surface of the drawer body 31, which is located in a direction of the air entering the first space 11.

Figure 15:
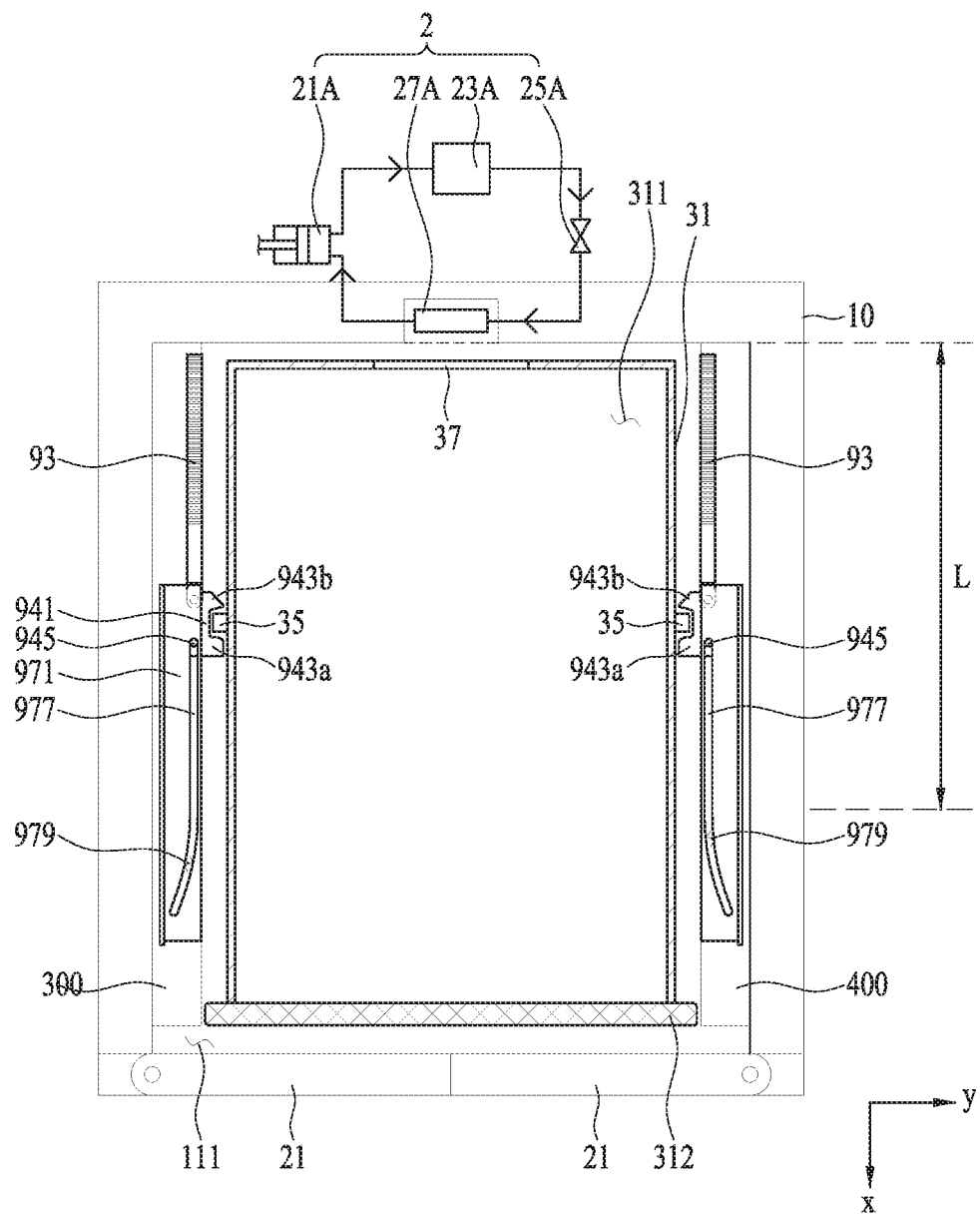
Figure 16:
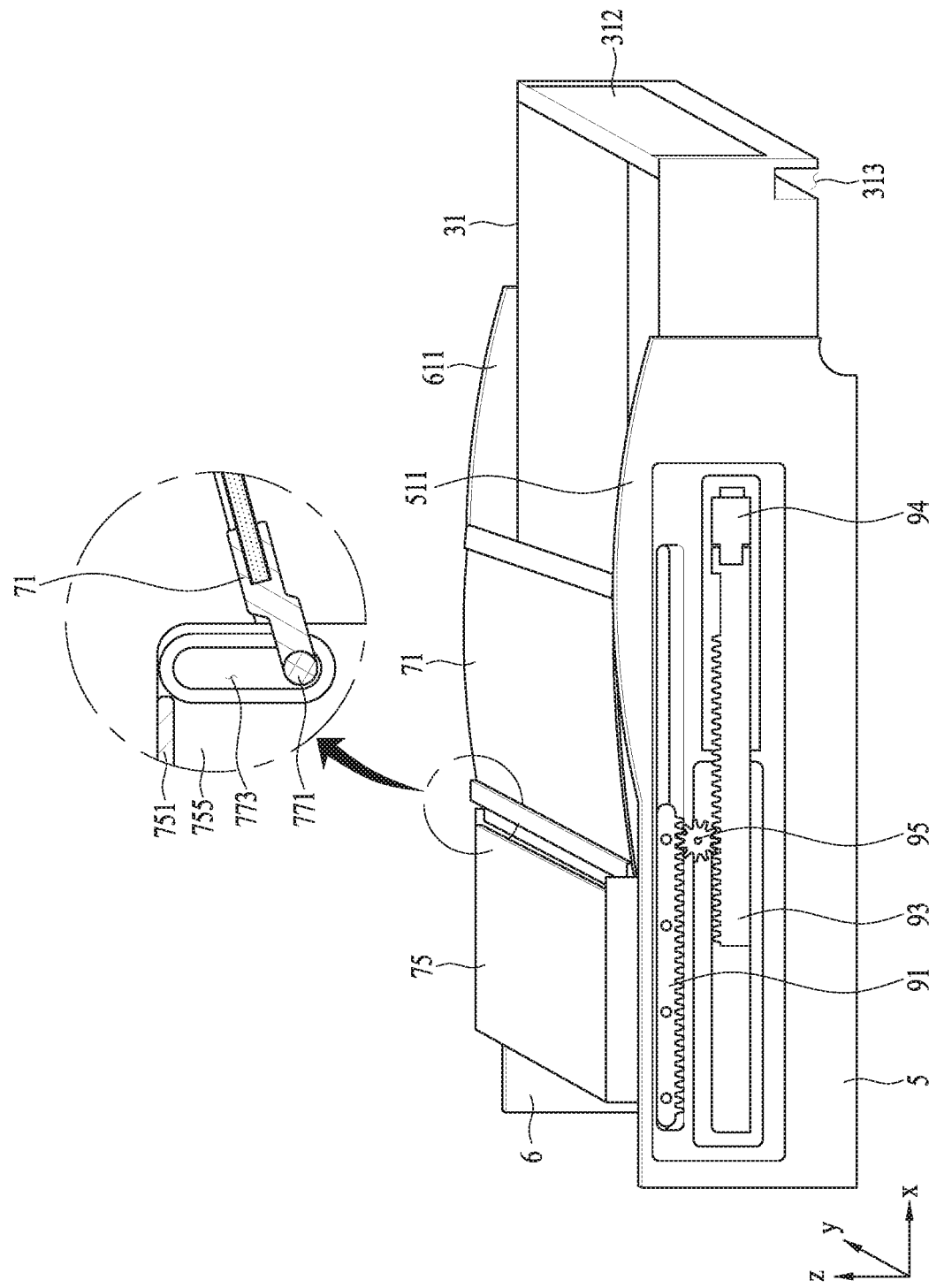
FIGS. 16 and 17 are views illustrating that a drawer provided in the storage device shown in FIG. 11 is drawn out of a storage space.

FIG. 15 illustrates that the air enters the storage unit through a rear surface of the first space 11. In this case, the storage space communication unit 37 may be provided on the rear surface of the drawer body 31. The storage space communication unit 37 may be provided as a hole that passes through the drawer body 31, or may be provided as a groove bent concavely from the upper end of the drawer body 31.

If the user draws the drawer body 31 out of the first space 11 through the handle 313 in the state of FIG. 15, the gear operation unit 35 and the detachable body 941 move to the same direction as the drawer body 31. If the detachable body 941 moves to the same direction (X-axis direction) as the drawer body 31, the first gear 91 may move to an opposite direction (−X-axis direction) of the moving direction of the drawer body 31 by means of the connection gear 95.

Since the first gear 91 is connected with the moving body 751, the cover member body 71 connected to the moving body 751 will move toward an opposite direction of the moving direction of the drawer body 31 (move toward a rear surface of the first space). As shown in FIG. 7, the cover member body 71 will move the rear surface of the first space 11 (move toward −X-axis direction) when the drawer body 31 moves. Therefore, in the present disclosure, the inlet 317 may be exposed as much as a sum of the area of the inlet 317 exposed as the drawer body 31 is drawn out of the first space 11 and the area of the inlet 317 exposed as the cover member body 71 moves through the inside of the first space 11.

Moreover, since the first front curved portion 511 and the second front curved portion 611 are provided at the front on the upper surface of the first support unit 5 and the second support unit 6 by which the cover member body 71 is supported, according to one embodiment of the present disclosure, the exposed area of the inlet 317 may be maximized. The aforementioned effect may be very useful when a mechanism for supporting storage goods, such as a rack, is located at the upper portion of the storage device P. If an interval between the support mechanism located at the upper portion of the storage device P and the storage device P is narrow, the user should more and more draw the drawer body 31 out of the first space 11 to insert storage goods having a great volume into the storage unit 311. In the present disclosure, the inlet 317 may be exposed at an area greater than the draw-out area of the drawer body 31.

Meanwhile, since the slot 773 for connecting the protrusion 771 provided in the cover member body 71 with the moving body 751 is provided to allow the protrusion 771 to move along a height direction (Y-axis direction) of the drawer body, when the cover member body 71 moves to the rear of the drawer body 31 along the first front curved portion 511 and the second front curved portion 611, the surface of the cover member body 71 may move to the rear of the drawer body 31 along each of the curved portions 511 and 611. Since the cover member flanges 711 and 713 (see FIG. 10) provided in the cover member body 71 are inserted into flange storage grooves 57 and 67 respectively provided in the support units 5 and 6, a problem that the cover member body 71 is twisted when the moving body 751 moves is solved.

If the cover member body 71 is twisted at the upper portion of the drawer body 31, it may be difficult to move the cover member body 71 to the rear of the drawer body 31, whereby cover member guiders in which an edge of the cover member body 71 is received may further be provided in the curved portions 511 and 513 of the first body and the curved portions 611 and 613 of the second body in addition to the flanges 711 and 713 and the flange storage grooves 57 and 67. That is, a first cover guider 56 (see FIG. 10) in which the edge of the cover member body 71 is received may further be provided in the first rear curved portion 511 and the first rear curved portion 513, and a second cover guider 66 (see FIG. 10) in which the edge of the cover member body 71 is received may further be provided in the second front curved portion 611 and the second rear curved portion 613.

Figure 17:
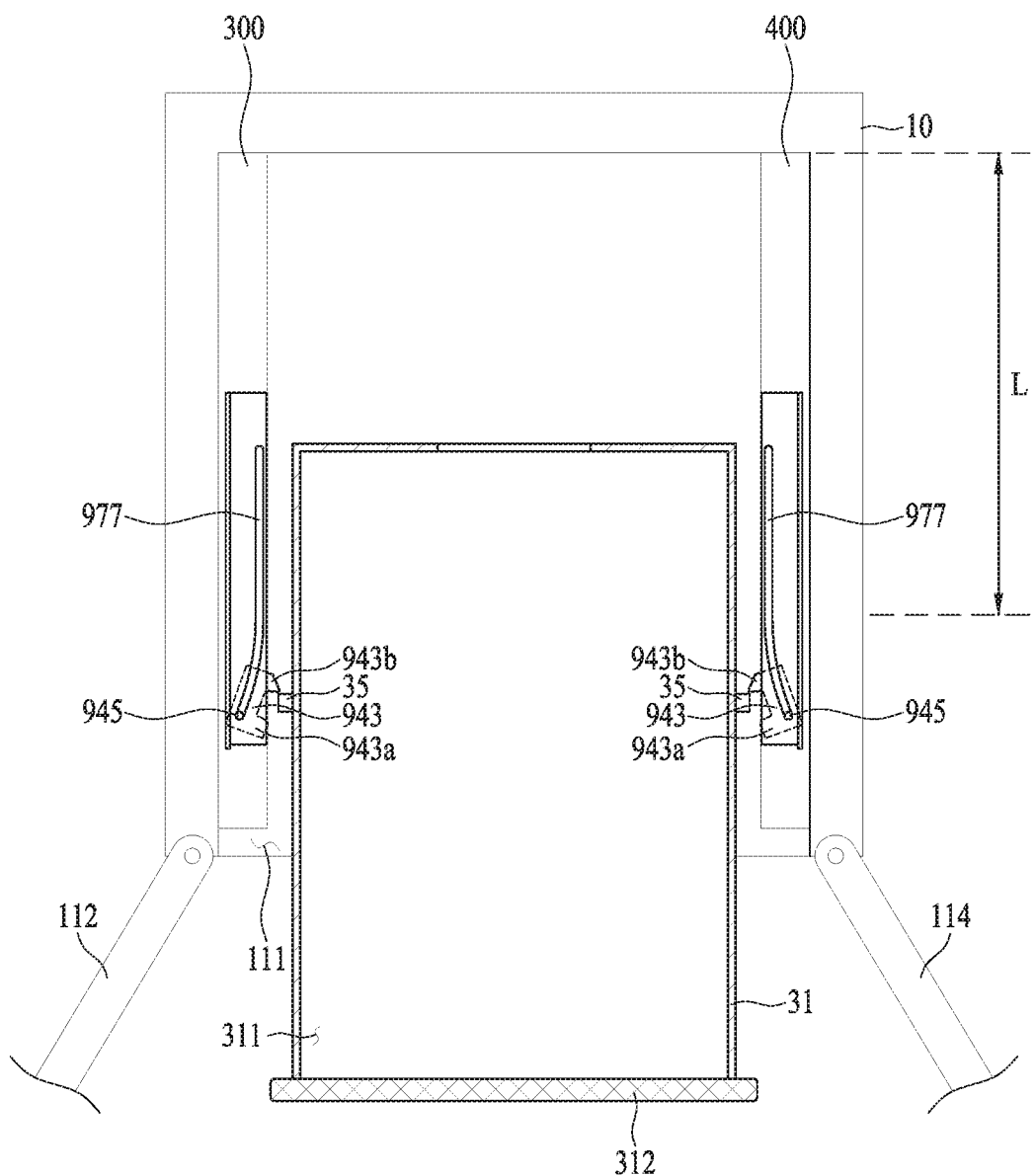

If the drawer body 31 is required to be detached from the first space 11 to clean the drawer body 31 for example, the user has only to pull the drawer body 31 in a direction of the first opened surface 111. As shown in FIG. 17, if the drawer body 31 is drawn out of the first space 11 at a reference distance L or more, the drawer body 31 becomes detachable from the driving unit 500. The reference distance L may be defined as a moving distance of the gear operation unit 35 that allows the coupling axis 945 to enter the second axis guider 979.

If the drawer body 31 is drawn out of the first space 11 at the reference distance or more, the coupling axis 945 may move to a direction far away from the drawer body 31 by means of the second axis guider 979. In this case, since the first stopper 943a moves to a direction far away from the drawer body 31, the gear operation unit 35 may be detached from the groove 943 of the detachable body 941.

In the embodiments described with reference to FIGS. 10 to 17, the elastic member 900 is omitted. However, in this embodiment, the elastic member 900 may be provided in the same manner as the other embodiments. The elastic member enables automatic insertion of the storage member and automatic shielding of the cover member. Since movement of the storage member interworks with movement of the cover member, the user may manipulate the storage member only without manipulating the cover member. Therefore, the user may use the storage member very conveniently.

In certain implementations, an apparatus comprises: a cabinet having a storage space; a door to selectively open or close the storage space; a drawer provided in the storage space and configured to be selectively inserted into or drawn out of the storage space, the drawer having an inlet through which goods are inserted into or removed from the drawer; supports configured to provide a moving path of the drawer and provided at sides of the drawer such that inner sides of the supports face each other; a cover provided to open or close the inlet and supported by the supports; and a driving assembly including gearing to interconnect the drawer and the cover such that the cover and the drawer move in opposite directions when the drawer is inserted into or drawn out of the storage space, wherein a front end of the cover rises along the supports while moving backward when the drawer is being drawn out of the storage space.

The supports may include curved regions provided at a front of the supports to allow the cover to move along the curved regions. The cover may include a curved surface which is provided at the front end of the cover and is supported by the curved regions of the supports, a curvature of the curved surface corresponding to a curvature of the curved regions of the supports.

The cover may include: a cover plate supported by the supports; a moving assembly that moves in an opposite direction of the moving direction of the drawer through the driving assembly; and a fastener configured to connect the cover body with the moving assembly. The cover may include cover flanges that support the cover plate in the supports and are provided in the cover plate, and each of the supports may further include a flange storage groove in which one of the cover flanges is received.

The moving assembly may include a moving plate provided parallel with the inlet, and extensions which couple the driving assembly to respective ends of the moving plate. The fastener may include a protrusion provided in one of the cover plate or the moving plate, and a slot provided in another one of the cover plate or the moving plate to receive the protrusion. The slot may be provided along a height direction of the extension such that the protrusion moves along a height direction of the drawer when the cover plate moves along the supports.

The driving assembly may include: a first gear supported in one of the supports and fixed to the drawer; a second gear supported in the one of the supports and fixed to the cover; and a connecting gear rotatably provided between the first gear and the second gear to connect the first gear with the second gear and rotatably fixed to the one of the supports. Each of the supports may further include: a first gear guide that provides a moving path of the first gear; and a second gear guide that provides a moving path of the second gear.

The driving assembly further may include: a first connector that couples the first gear and the cover; and a second connector that couples the second gear and the drawer, wherein each of the supports further includes: a plate provided to extend along a direction parallel to a moving direction of the drawer; a first gear guide provided on a first side of the plate that is opposite to a second side of the body facing the drawer to provide a moving path of the first gear; a first slot configured to penetrate the plate inside the first gear guide to provide a moving path of the first connector; a second gear guide provided on the first side of the body to provide a moving path of the second gear; and a second slot configured to penetrate the body inside the second gear guider to provide a moving path of the second connector.

The second connector may include: a detachable body to which the drawer is detachably coupled; and a connector guide that detaches the detachable body from the drawer when the drawer is drawn out of the storage space. The drawer may include a gear operation protrusion detachably coupled to the detachable body, and the detachable body includes a first stopper and a second stopper in which the gear operation protrusion is received, and a coupling axis coupled to the connector guide.

The connector guide may include: a guide body provided inside the second gear guide; and axis guides provided in the guide body and configured to receive the coupling axis. The axis guide may include: a first axis guide provided in parallel with the moving direction of the drawer inside the second gear guide to provide a moving path of the coupling axis; and a second axis guide provided to extend from the first axis guide and away from the drawer toward the door.

In another implementation, an apparatus comprises: a cabinet having a storage space; a door to selectively open or close the storage space; a drawer provided in the storage space and configured to be selectively inserted into or drawn out of the storage space, the drawer having an inlet through which goods are inserted into or removed from the drawer; supports configured to provide a moving path of the drawer and provided at sides of the drawer such that inner sides of the supports face each other; a cover provided to open or close the inlet and positioned on upper surfaces of the supports; a first gear supported in one of the supports and fixed to the drawer; a second gear supported in the one of the supports and fixed to the drawer; and a connecting gear rotatably provided between the first gear and the second gear to connect the first gear with the second gear and rotatably fixed to the one of the supports such that the first gear and the second gear move in different directions when the drawer is inserted into or drawn out of the storage space.

The supports may include curved regions provided at a front of the supports to allow the cover to move along the curved regions, and the cover may include a curved surface which is provided at the front end of the cover and is supported by the curved regions of the supports, a curvature of the curved surface corresponding to a curvature of the curved regions of the supports.

The cover may include: a cover plate supported by the supports; a moving assembly that is coupled to the second gear to moves in an opposite direction of the moving direction of the drawer through the driving assembly; and a fastener configured to connect the cover body with the moving assembly. The cover may further include cover flanges that support the cover plate in the supports and are provided in the cover plate, and each of the supports further may include a flange storage groove in which one of the cover flanges is received.

The moving assembly may include a moving plate provided parallel with the inlet, and extensions which couple the driving assembly to respective ends of the moving plate, and the fastener includes a protrusion provided in one of the cover plate or the moving plate, and a slot provided in another one of the cover plate or the moving plate to receive the protrusion.

It will be apparent to those skilled in the art that the present disclosure may be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

INDUSTRIAL APPLICABILITY

Industrial applicability is disclosed in the detailed description of the present disclosure.

The invention claimed is:
1. An apparatus comprising:
a cabinet having a storage space;
a door to selectively open or close the storage space;
a drawer provided in the storage space and configured to be selectively inserted into or drawn out of the storage space, the drawer having an inlet through which goods are inserted into or removed from the drawer;
supports configured to provide a moving path of the drawer and provided at sides of the drawer such that inner sides of the supports face each other;
a cover provided to open or close the inlet and supported by the supports; and
a driving assembly including gearing to interconnect the drawer and the cover such that the cover and the drawer move in opposite directions when the drawer is inserted into or drawn out of the storage space,
wherein a front end of the cover rises along the supports while moving backward when the drawer is being drawn out of the storage space, and
wherein the supports include curved regions provided at a front of the supports to allow the cover to move along the curved regions.

2. The apparatus according to claim 1, wherein the cover includes a curved surface which is provided at the front end of the cover and is supported by the curved regions of the supports, a curvature of the curved surface corresponding to a curvature of the curved regions of the supports.

3. The apparatus according to claim 1, wherein the cover includes:
a cover plate supported by the supports;
a moving assembly that moves in an opposite direction of the moving direction of the drawer through the driving assembly; and
a fastener configured to connect the cover with the moving assembly.

4. The apparatus according to claim 3, wherein the cover further includes cover flanges that support the cover plate in the supports and are provided in the cover plate, and each of the supports further includes a flange storage groove in which one of the cover flanges is received.

5. The apparatus according to claim 4, wherein the moving assembly includes a moving plate provided parallel with the inlet, and extensions which couple the driving assembly to respective ends of the moving plate.

6. The apparatus according to claim 5, wherein the fastener includes a protrusion provided in one of the cover plate or the moving plate, and a slot provided in another one of the cover plate or the moving plate to receive the protrusion.

7. The apparatus according to claim 6, wherein the slot is provided along a height direction of the extension such that the protrusion moves along a height direction of the drawer when the cover plate moves along the supports.

8. The apparatus according to claim 3, wherein the driving assembly includes:
   a first gear supported in one of the supports and fixed to the drawer;
   a second gear supported in the one of the supports and fixed to the cover; and
   a connecting gear rotatably provided between the first gear and the second gear to connect the first gear with the second gear and rotatably fixed to the one of the supports.

9. The apparatus according to claim 8, wherein each of the supports further includes:
   a first gear guide that provides a moving path of the first gear; and
   a second gear guide that provides a moving path of the second gear.

10. The apparatus according to claim 8, wherein the driving assembly further includes:
    a first connector that couples the first gear and the cover; and
    a second connector that couples the second gear and the drawer,
    wherein each of the supports further includes:
      a plate provided to extend along a direction parallel to a moving direction of the drawer;
      a first gear guide provided on a first side of the plate that is opposite to a second side of the body facing the drawer to provide a moving path of the first gear;
      a first slot configured to penetrate the plate inside the first gear guide to provide a moving path of the first connector;
      a second gear guide provided on the first side of the body to provide a moving path of the second gear; and
      a second slot configured to penetrate the body inside the second gear guider to provide a moving path of the second connector.

11. The apparatus according to claim 10, wherein the second connector includes:
    a detachable body to which the drawer is detachably coupled; and
    a connector guide that detaches the detachable body from the drawer when the drawer is drawn out of the storage space.

12. The apparatus according to claim 11, wherein the drawer includes a gear operation protrusion detachably coupled to the detachable body, and
    the detachable body includes a first stopper and a second stopper in which the gear operation protrusion is received, and a coupling axis coupled to the connector guide.

13. The apparatus according to claim 12, wherein the connector guide includes:
    a guide body provided inside the second gear guide; and
    axis guides provided in the guide body and configured to receive the coupling axis.

14. The apparatus according to claim 13, wherein the axis guide includes:
    a first axis guide provided in parallel with the moving direction of the drawer inside the second gear guide to provide a moving path of the coupling axis; and
    a second axis guide provided to extend from the first axis guide and away from the drawer toward the door.

15. An apparatus comprising:
    a cabinet having a storage space;
    a door to selectively open or close the storage space;
    a drawer provided in the storage space and configured to be selectively inserted into or drawn out of the storage space, the drawer having an inlet through which goods are inserted into or removed from the drawer;
    supports configured to provide a moving path of the drawer and provided at sides of the drawer such that inner sides of the supports face each other;
    a cover provided to open or close the inlet and positioned on upper surfaces of the supports;
    a first gear supported in one of the supports and fixed to the drawer;
    a second gear supported in the one of the supports and fixed to the drawer;
    a connecting gear rotatably provided between the first gear and the second gear to connect the first gear with the second gear and rotatably fixed to the one of the supports such that the first gear and the second gear move in different directions when the drawer is inserted into or drawn out of the storage space;
    a first connector that couples the first gear and the cover; and
    a second connector that couples the second gear and the drawer, the second connector including a detachable body to which the drawer is detachably coupled, and the detachable body being detached from the drawer when the drawer is drawn out of the storage space.

16. The apparatus according to claim 15, wherein the supports include curved regions provided at a front of the supports to allow the cover to move along the curved regions, and
    wherein the cover includes a curved surface which is provided at the front end of the cover and is supported by the curved regions of the supports, a curvature of the curved surface corresponding to a curvature of the curved regions of the supports.

17. The apparatus according to claim 15, wherein the cover includes:
    a cover plate supported by the supports;
    a moving assembly that is coupled to the first gear to move in an opposite direction of the moving direction of the drawer through the driving assembly; and
    a fastener configured to connect the cover plate with the moving assembly.

18. The apparatus according to claim 17, wherein the cover further includes cover flanges that support the cover plate in the supports and are provided in the cover plate, and each of the supports further includes a flange storage groove in which one of the cover flanges is received.

19. The apparatus according to claim 17, wherein the moving assembly includes a moving plate provided parallel with the inlet, and extensions which couple the driving assembly to respective ends of the moving plate, and
    wherein the fastener includes a protrusion provided in one of the cover plate or the moving plate, and a slot provided in another one of the cover plate or the moving plate to receive the protrusion.

20. An apparatus comprising:
a cabinet having a storage space;
a door to selectively open or close the storage space;
a drawer provided in the storage space and configured to be selectively inserted into or drawn out of the storage space, the drawer having an inlet through which goods are inserted into or removed from the drawer;
supports configured to provide a moving path of the drawer and provided at sides of the drawer such that inner sides of the supports face each other;
a cover provided to open or close the inlet and positioned on upper surfaces of the supports;
a first gear supported in one of the supports and fixed to the drawer;
a second gear supported in the one of the supports and fixed to the drawer; and
a connecting gear rotatably provided between the first gear and the second gear to connect the first gear with the second gear and rotatably fixed to the one of the supports such that the first gear and the second gear move in different directions when the drawer is inserted into or drawn out of the storage space,
wherein the cover includes:
    a cover plate supported by the supports;
    a moving assembly that is coupled to the first gear to move in an opposite direction of the moving direction of the drawer through the driving assembly; and
    a fastener configured to connect the cover plate with the moving assembly.

* * * * *